(12) United States Patent
Kim et al.

(10) Patent No.: US 10,015,303 B2
(45) Date of Patent: Jul. 3, 2018

(54) ELECTRONIC DEVICE, ACCESSORY APPARATUS AND INFORMATION DISPLAYING METHOD USING THE SAME

(71) Applicant: Samsung Electronics Co., Ltd., Suwon-si, Gyeonggi-do (KR)

(72) Inventors: Geon-Woo Kim, Hwaseong-si (KR); Ki-Hyun Kim, Anyang-si (KR); Seo-Yeon Park, Hwaseong-si (KR); Jun-Yeop Jung, Suwon-si (KR); Seong-Hwan Kim, Incheon (KR); Su-Jeong Baek, Suwon-si (KR); Hyung-Wook Jang, Suwon-si (KR); Kang-Ho Ko, Suwon-si (KR)

(73) Assignee: Samsung Electronics Co,. Ltd., Suwon-si (KR)

(\*) Notice: Subject to any disclaimer, the term of this patent is extended or adjusted under 35 U.S.C. 154(b) by 0 days.

(21) Appl. No.: 15/425,576

(22) Filed: Feb. 6, 2017

(65) Prior Publication Data
US 2017/0244823 A1    Aug. 24, 2017

(30) Foreign Application Priority Data
Feb. 19, 2016  (KR) ........................ 10-2016-0020073

(51) Int. Cl.
*H04W 4/00* (2018.01)
*H04M 1/725* (2006.01)
(Continued)

(52) U.S. Cl.
CPC ............ *H04M 1/7253* (2013.01); *H04B 5/00* (2013.01); *H04M 1/0245* (2013.01);
(Continued)

(58) Field of Classification Search
CPC ....... H04W 4/008; H04W 88/06; H04W 4/00; H04W 12/06; H04M 1/725; H04B 5/0031;
(Continued)

(56) References Cited

U.S. PATENT DOCUMENTS 9,749,824 B2\*  8/2017  Mayer ................... H04W 4/008
2009/0124308 A1  5/2009  Lee
(Continued)

FOREIGN PATENT DOCUMENTS

KR         10-1167265 B1      7/2012
KR    10-2013-0043910 A       5/2013
(Continued)

*Primary Examiner* — Thanh Le
(74) *Attorney, Agent, or Firm* — Jefferson IP Law, LLP

(57) ABSTRACT

An accessory apparatus and an information display method are provided. The accessory apparatus include a housing, a display exposed through a first portion of the housing, a conductive pattern, a wireless communication circuit configured to support a short-range wireless communication protocol, at least one processor, and a memory, wherein the memory stores instructions that allow the at least one processor to control the wireless communication circuit to operate in the first mode, operate in the second mode in which the second type of external electronic device is allowed to read the second data for the second time period following the first time period, detect the existence of the second type of external electronic device at one or more points of time in the first time period, and switch into the second mode when the existence of the second type of external electronic device is detected.

20 Claims, 23 Drawing Sheets

(51) Int. Cl.
  *H04W 4/80* (2018.01)
  *H04B 5/00* (2006.01)
  *H04M 1/02* (2006.01)
  *H04M 1/04* (2006.01)
  *H04M 1/18* (2006.01)
  *H04B 1/3888* (2015.01)

(52) U.S. Cl.
  CPC ....... *H04M 1/72575* (2013.01); *H04W 4/008* (2013.01); *H04W 4/80* (2018.02); *H04B 1/3888* (2013.01); *H04M 1/04* (2013.01); *H04M 1/185* (2013.01); *H04M 1/72569* (2013.01); *H04M 2250/04* (2013.01)

(58) Field of Classification Search
  CPC .... H04B 5/0056; H04B 5/00; H04B 1/38888; H02J 17/00; H03K 17/94; H05K 5/03; H01Q 1/22; H01Q 7/00; A45C 11/00
  See application file for complete search history.

(56) References Cited

U.S. PATENT DOCUMENTS

| | | |
|---|---|---|
| 2014/0021799 A1 | 1/2014 | Sankararamalingam et al. |
| 2014/0073242 A1 | 3/2014 | Chen et al. |
| 2014/0376192 A1 | 12/2014 | Park et al. |
| 2015/0382135 A1 | 12/2015 | Kawahara et al. |
| 2016/0043764 A1 | 2/2016 | Huang |
| 2017/0201945 A1 | 7/2017 | Chae et al. |

FOREIGN PATENT DOCUMENTS

| | | |
|---|---|---|
| KR | 10-1332329 B1 | 11/2013 |
| KR | 10-2014-0089753 A | 7/2014 |
| KR | 10-1469652 B1 | 12/2014 |
| KR | 10-2015-0020973 A | 2/2015 |
| KR | 10-2015-0028042 A | 3/2015 |
| KR | 10-2016-0011925 A | 2/2016 |
| WO | 2015/075500 A1 | 5/2015 |

\* cited by examiner

| 2F 39 00 | | | | |
|---|---|---|---|---|
| MT | GID | OID | length | Payload |
| 001b | 1111b | 1110001b | 0 | None |

(a)

| 4F 39 01 00 | | | | | |
|---|---|---|---|---|---|
| MT | GID | OID | length | Payload | Description |
| 001b | 1111b | 1110001b | 0x01 | 0x00 | RF not detected |

(b)

| 4F 39 01 1F | | | | | |
|---|---|---|---|---|---|
| MT | GID | OID | length | Payload | Description |
| 010b | 1111b | 1110001b | 0x01 | 0x1F | RF detected |

ELECTRONIC DEVICE, ACCESSORY APPARATUS AND INFORMATION DISPLAYING METHOD USING THE SAME

CROSS REFERENCE TO RELATED APPLICATION(S)

This application claims the priority under 35 U.S.C. § 119(a) to Korean Application Serial No. 10-2016-0020073, which was filed in the Korean Intellectual Property Office on Feb. 19, 2016, the entire content of which is hereby incorporated by reference.

TECHNICAL FIELD

Various embodiments of the present disclosure relate to an electronic device, an accessory apparatus, and an information display method using the same.

BACKGROUND

With the remarkable development of information communication technology and semiconductor technology, the dissemination and usage of various electronic devices are sharply increasing. In particular, recent electronic devices have been developed to enable communication while being carried.

For example, electronic devices (such as smart phones, personal computers, or tablets) provide a variety of useful functions to users through various applications. The electronic devices have been changing into devices that enable the use of a variety of information, as well as a voice call function, through the provision of various functions.

Recently, accessory apparatuses have been developed, which interwork with the electronic device or execute some functions of the electronic device while being connected with the electronic device, and have been provided to be used together with the electronic device. For example, the accessory apparatuses may be various devices, such as a protective cover for protecting the electronic device, a dock for holding the electronic device, or a charger for charging the electronic device.

SUMMARY

In order to transfer the power of an electronic device to an accessory apparatus, the electronic device may have a hole that is formed in a portion thereof for connecting the accessory apparatus and the electronic device, and may operate the accessory apparatus by supplying power to the accessory apparatus through the hole. Since the accessory apparatus is supplied with power through the hole that is formed in the electronic device, in the case where the electronic device has no hole formed therein, it may be difficult to supply power to the accessory apparatus.

Various embodiments of the present invention may provide a method and a device in which an electronic device that is connected to an accessory apparatus can wirelessly transfer power and data to the accessory apparatus.

Various embodiments may provide an electronic device, an accessory apparatus, and an information display method using the same.

According to various embodiments, an electronic device may include a housing, a display that is exposed through a first portion of the housing, a conductive pattern configured to be positioned inside the housing or to form a part of the housing, a wireless communication circuit configured to electrically connect with the conductive pattern, and to support a short-range wireless communication protocol, at least one processor configured to electrically connect with the display and the wireless communication circuit, and a memory configured to electrically connect with the at least one processor, to store instructions that allow the at least one processor to control the wireless communication circuit to operate in a first mode in which first data is provided to a first type of external electronic device for a first time period, operate in a second mode in which a second type of external electronic device is allowed to read second data for a second time period following the first time period, detect the existence of the second type of external electronic device at one or more selected points of time in the first time period; and switch to the second mode when the existence of the second type of external electronic device is detected.

According to various embodiments, an electronic device may include a housing, a display exposed through a first portion of the housing, a conductive pattern configured to be positioned inside the housing, or to form a part of the housing, a wireless communication circuit configured to electrically connect with the conductive pattern and support an NFC (near field communication) protocol, at least one processor configured to electrically connect with the display and the wireless communication circuit, and a memory configured to electrically connect with the at least one processor, wherein the wireless communication circuit is further configured to operate in a first mode for a first time period, operate in a second mode to allow an external electronic device to read data for a second time period following the first time period, detect an existence of the external electronic device for the first time period, and switch to the second mode when the existence of the external electronic device is detected.

According to various embodiments, a method for operating an electronic device may include providing an electronic device that includes a housing, a display that is exposed through a first portion of the housing, a conductive pattern that is positioned inside the housing or forms a part of the housing, and a wireless communication circuit that is electrically connected with the conductive pattern, operating the electronic device in a first mode in which first data is provided to a first type of external electronic device for a first time period, operating the electronic device in a second mode in which a second type of external electronic device is allowed to read second data for a second time period following the first time period, detecting, by the electronic device, an existence of the second type of external electronic device at one or more selected points of time in the first time period, and switching to the second mode when the existence of the second type of external electronic device is detected.

In various embodiments of the present disclosure, when an external electronic device is detected even while the electronic device transfers power or data to an accessory apparatus, it is possible to rapidly transfer power or data to the external electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIGS. 22A and 22B are views illustrating a data packet that is transmitted between a processor and a near field communication (NFC) module, according to various embodiments of the present disclosure.

Throughout the drawings, it should be noted that like reference numbers are used to depict the same or similar elements, features, and structures.

DETAILED DESCRIPTION

Figure 1:
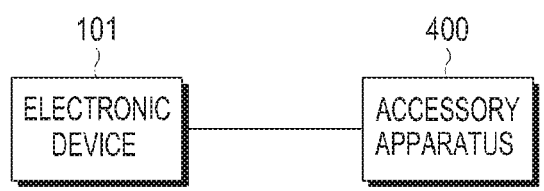
FIG. 1 illustrates an electronic device and an accessory apparatus, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion picture experts group 1 (MPEG-1) audio layer-3 (MP3) player, a mobile medical device, a camera, and a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television (TV), a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to an embodiment of the present disclosure is not limited to the above described devices. As used herein, the term "user" may indicate a person who uses an electronic device or a device (e.g., an artificial intelligence electronic device) that uses an electronic device.

FIG. 1 illustrates an electronic device and an accessory apparatus, according to an embodiment of the present disclosure.

Referring to FIG. 1, the electronic device 101 and the accessory apparatus 400 may be electrically connected with each other by using wireless communication, and the accessory apparatus 400 may have a display element to display data. The electronic device 101 may include a housing, and the accessory apparatus 400 may be a protective cover of the electronic device 101. The protective cover may include the first side that is directed in the first direction, the second side that is directed in the second direction that is the opposite direction of the first direction, and the third side that surrounds some of the space between the first side and the second side. According to various embodiments, the protective cover may include a front cover portion (e.g., the first side) and a back cover portion (e.g., the second side).

According to an embodiment, the electronic device 101 may be coupled to the accessory apparatus 400 in order to thereby perform the verification (or certification, or authorization) with respect to the accessory apparatus 400. The coupling of the electronic device 101 and the accessory apparatus 400 may mean that the back cover portion of the accessory apparatus 400 is coupled to the back side of the electronic device 101. For example, when the back side of the electronic device 101 and the back cover portion of the accessory apparatus 400 are coupled (or fastened), the electronic device and the accessory apparatus 400 may be connected. At this time, when the front cover portion of the accessory apparatus 400 comes into contact with the front side of the electronic device 101, the electronic device 101 may detect a second detection member 402 of the accessory apparatus 400 in order to thereby determine that the front cover portion of the accessory apparatus 400 is closed. When the front cover portion of the accessory apparatus 400 is in the closed state, the electronic device 101 may enter a standby state (or a standby mode). The electronic device 101 may operate in a reader mode when it is coupled to the accessory apparatus 400. The reader mode may refer to a mode in which specific information may be written or read when a near field communication (NFC) card (e.g., an NFC tag) is recognized (or verified). For example, the reader mode may refer to a mode in which power or data may be transmitted to the accessory apparatus 400 when the accessory apparatus 400 is recognized (or verified).

The electronic device 101 and the accessory apparatus 400 may perform the verification with each other by using a short-range communication scheme, such as an NFC scheme or a radio frequency identification (RFID) communication scheme. As a result of the verification, if the accessory apparatus 400 is acceptable, the electronic device 101 may switch to the standby mode (or the standby state), and when an event for the data display occurs, the electronic device 101 may enter the first mode (e.g., an accessory mode) in order to thereby transmit the power and data to the electronic device 101 for the first period of time. The accessory mode may refer to an operation mode in which an external electronic device (e.g., an NFC reader) is detected while transmitting the power and data to the accessory apparatus 400. The first period of time may be a configured period of time or a random period of time.

According to an embodiment, when the accessory apparatus 400 is coupled to the electronic device 101, the accessory apparatus 400 may perform the verification with the electronic device 101, and may be deactivated when the verification is completed. When the power and data related to the occurred event are received from the electronic device 101, the accessory apparatus 400 may be activated, and may display information on the event that has occurred in the electronic device 101 by using the received data.

According to an embodiment, the electronic device 101 may determine whether or not an external electronic device is detected at one or more selected timings during the first period of time (e.g., while operating in the first mode). For example, the electronic device 101 may transmit, to the accessory apparatus 400, a request signal to detect the presence of the external electronic device at one or more selected timings. If a response signal is not received from the accessory apparatus 400 for a specified period of time, or if a response signal including error data is received, the electronic device 101 may detect the presence of the external electronic device.

According to an embodiment, the electronic device 101 may stop the transmission of the first radio frequency (RF) signal at one or more selected timings, and if an external RF field (or an external RF signal) is detected, the electronic device 101 may detect the presence of the external electronic device.

When the external electronic device is detected, the electronic device 101 may switch to the second mode (e.g., a card emulation mode) in order to allow the data of the electronic device 101 to be read for the second period of time. The data may contain payment related information (e.g., information necessary for the electronic payment). The card emulation mode may be an operation mode that allows the external electronic device to read the data of the electronic device 101. For example, the second mode may be a P2P (peer to peer) mode of an NFC protocol. The second period of time may be a specified period of time or a random period of time. For example, the second period of time may be a period of time that follows the first period of time.

For example, when the external electronic device is detected, the electronic device 101 may stop the transmission of the power and data to the accessory apparatus 400, and may allow the external electronic device to read the data of the electronic device 101.

According to an embodiment, the electronic device 101 may search for the external electronic device while transmitting the power to the accessory apparatus 400. At this time, if the external electronic device is discovered, the electronic device 101 may stop the transmission of the power to the accessory apparatus 400, and may perform a communication connection with the external electronic device and a specific operation therewith. When the operation with the external electronic device is completed, the electronic device 101 may switch to the standby mode (or the search mode), or if the transmission of the power and data to the accessory apparatus 400 has not yet been completed, may resume the transmission of the power and data to the accessory apparatus 400. The standby mode (or the search mode) may be an operation mode for detecting (or searching for) the presence of one or more external electronic devices.

According to an embodiment, if the external electronic device is not detected in the standby mode (or the search mode), the electronic device 101 may maintain the standby mode (or the search mode), or if the transmission of the power and data to the accessory apparatus 400 has not yet been completed, may resume the transmission of the power and data to the accessory apparatus 400.

Figure 2:
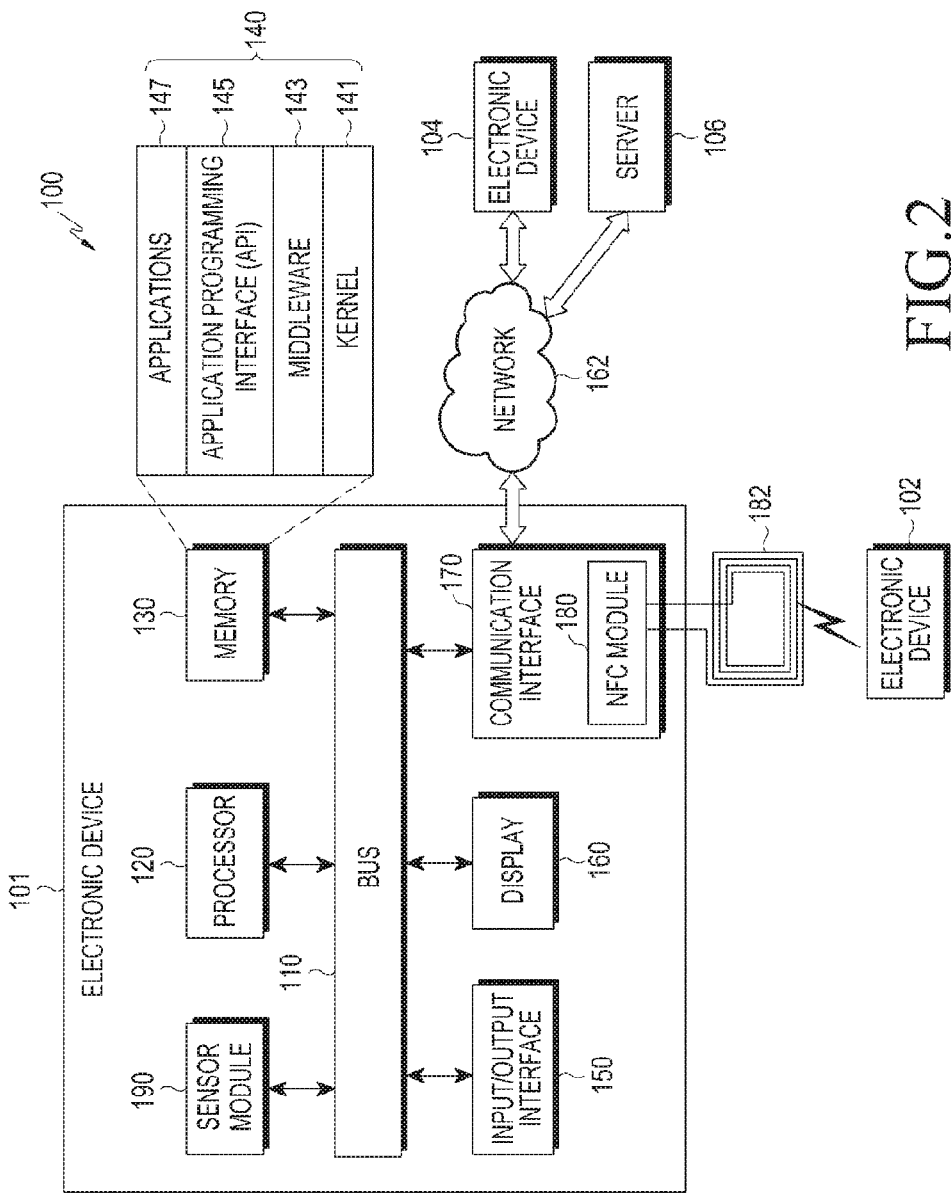
FIG. 2 illustrates a network environment that includes an electronic device, according to an embodiment of the present disclosure.

FIG. 2 illustrates a network environment that includes an electronic device, according to an embodiment of the present disclosure.

Referring to FIG. 2, the electronic device 101 in the network environment 100 is disclosed, according to various embodiments. The electronic device 101 may include a bus 110, a processor 120, a memory 130, an input/output interface 150, a display 160, a communication interface 170, an NFC module 180, an NFC antenna 182 and a sensor module 190. In some embodiments, the electronic device 101 may exclude one or more elements, or may add other elements thereto.

The bus 110, for example, may include a circuit for connecting the elements 110 to 170 with each other and transferring communication data (e.g., control messages and/or data) between the elements.

The processor 120 may include at least one of a CPU, an AP, or a communication processor (CP). The processor 120, for example, may process a calculation or data related to the control and/or communication of one or more other elements of the electronic device 101.

According to an embodiment, when a detection signal indicates that the electronic device 101 has been mounted on the accessory apparatus 400 is received from the sensor module 190 that detects a first detection member 401, the processor 120 may transmit, to the accessory apparatus 400, a verification request signal to request the genuineness verification on the accessory apparatus 400 through the NFC module 180. The NFC module 180 may operate in the reader mode in order to provide the power and data to the accessory apparatus 400.

When the genuineness verification of the accessory apparatus 400 is completed, the processor 120 may determine whether or not an event for displaying information occurs. If the event occurs, the processor 120 may control the NFC module 180 to operate in the first mode (e.g., the accessory mode) for the first period of time in order to thereby transmit the first RF signal to the accessory apparatus 400 through the NFC module 180. The first RF signal may contain the power and data related to the event.

The processor 120 may transmit, to the accessory apparatus 400, an event checking signal to check the occurrence of the event of the accessory apparatus 400 through the NFC module 180, and when the second RF signal, which contains a response (e.g., a response signal or response data) to the event checking signal, is received from the accessory apparatus 400, the processor 120 may perform the operation (or the function) corresponding to the second RF signal.

According to various embodiments, the signals transmitted and received in the electronic device 101 and the accessory apparatus 400 may be the RF signals. For example, the signal that is transmitted from the electronic device 101 may be the first RF signal, and the signal that is transmitted from the accessory apparatus 400 may be the second RF signal.

According to an embodiment, the processor 120 may control the NFC module 180 to detect the external electronic device at one or more selected timings for the first period of time. When the external electronic device is detected, the processor 120 may control the NFC module 180 to operate in the second mode (e.g., the card emulation mode) for the second period of time.

According to an embodiment, the processor 120 may transmit a command for detecting the external electronic device to the NFC module 180 and may control the NFC module 180 to operate in the second mode (e.g., the card emulation mode) for the second period of time based on a response from the NFC module 180.

According to an embodiment, if a signal indicating that the external electronic device has been detected is received from the NFC module 180, the processor 120 may control the NFC module 180 to operate in the second mode (e.g., the card emulation mode) for the second period of time.

According to an embodiment, if the external electronic device is not detected, the processor 120 may control the NFC module 180 to operate in the standby mode (or the search mode) or in the reader mode.

According to an embodiment, the NFC module 180 may include one or more control circuits (not shown). For example, the control circuit included in the NFC module 180 may perform at least some of the operations that are performed by the processor 120. For example, the control circuit may control the NFC module 180 to detect the external electronic device at one or more selected timings for the first period of time. When a signal indicating that the external electronic device has been detected is received through the NFC antenna 182, the control circuit may control the NFC module 180 to operate in the second mode for the second period of time. If the external electronic device has not been detected, the control circuit may control the NFC module 180 to operate in the standby mode (or the search mode) or in the reader mode. The control circuit included in the NFC module 180, for example, may be implemented in the form of a micro controller unit (MCU).

The memory 130 may include a volatile and/or non-volatile memory. For example, the memory 130 may store commands or data related to one or more other elements of the electronic device 101.

According to an embodiment, the memory 130 may store the data that is used for the genuineness verification of the accessory apparatus 400 and the information display of the accessory apparatus 400.

According to an embodiment, the memory 130 may store software and/or programs 140. For example, the programs 140 may include a kernel 141, middleware 143, an application programming interface (API) 145, and/or an application programs (or "applications") 147. At least some of the kernel 141, the middleware 143, or the API 145 may be referred to as an operating system.

The kernel 141 may control or manage system resources (for example, the bus 110, the processor 120, or the memory 130), which are used to execute the operation or function that is implemented in other programs (for example, the middleware 143, the API 145, or the application program 147). In addition, the kernel 141 may provide an interface by which the middleware 143, the API 145, or the application programs 147 may access each element of the electronic device 101 to control or manage the system resources.

The middleware 143 may play the intermediate role between the API 145 or the application programs 147 and the kernel 141 to communicate with each other for the transmission and reception of data. For example, the middleware 143 may process one or more operation requests that are received from the application program 147 according to the priority. For example, the middleware 143 may give priority for using the system resources (for example, the bus 110, the processor 120, or the memory 130) of the electronic device 101 to the one or more application programs 147 in order to thereby process the one or more operation requests. The API 145 may be an interface by which the application program 147 controls functions that are provided by the kernel 141 or the middleware 143. For example, the API 145 may include one or more interfaces or functions (e.g., commands) for file control, window control, image processing, or text control. The input/output interface 150 may transfer commands or data received from a user or other external devices to other elements of the electronic device 101, or may output commands or data received from the other elements of the electronic device 101 to the user or the other external devices.

The display 160 may include a liquid crystal display (LCD), a light-emitting diode (LED) display, an organic LED (OLED) display, a micro-electro-mechanical system (MEMS) display, an electronic paper display, or the like. For example, the display 160 may display a variety of content (e.g., text, images, videos, icons, and/or symbols) to the user. The display 160 may include a touch screen, and, for example, may receive a touch input, a gesture input, a proximity input, or a hovering input by using electronic pens or a user's body part.

The communication interface 170 may configure communication between the electronic device 101 and external devices (e.g., a first external electronic device 102, a second external electronic device 104, or a server 106). For example, the communication interface 170 may be connected to a network 162 through wireless communication or wired communication in order to thereby communicate with the external devices (e.g., the second external electronic device 104 or the server 106).

For example, the wireless communication may include a cellular communication that uses at least one of long term evolution (LTE), LTE Advance (LTE-A), code division multiple access (CDMA), wideband CDMA (WCDMA), a universal mobile telecommunications system (UNITS), wireless broadband (WiBro), global system for mobile communications (GSM), or the like. According to an embodiment, the wireless communication, for example, may include at least one of wireless fidelity (WiFi), Bluetooth (BT), Bluetooth low energy (BLE), Zigbee, NFC, magnetic secure transmission, RF, or a body area network (BAN). According to an embodiment, the wireless communication may include a global navigation satellite system (GNSS). The GNSS, for example, may include a global positioning system (GPS), a global navigation satellite system (Glonass), the Beidou Navigation Satellite System (Beidou), the Galileo, or the European global satellite based navigation system. Hereinafter, the GPS may be interchangeably used with the GNSS in the present document. For example, the wired communication may include at least one of a universal serial bus (USB), a high definition multimedia interface (HDMI), recommended standard 232 (RS-232), power cable communication, or a plain old telephone service (POTS). The network 162 may include at least one of telecommunication networks, such as a computer network (e.g., local area network (LAN) or wide area network (WAN)), the Internet, or a telephone network.

According to an embodiment, the communication module 170 may include the NFC module 180, and the NFC module 180 may transmit and receive signals through the NFC antenna 182 by using a short-range wireless communication protocol (e.g., an NFC protocol). For example, the NFC module 180 may transfer a verification request signal to the accessory apparatus 400, and may receive a verification response signal from the accessory apparatus 400.

When the electronic device 101 and the accessory apparatus 400 are coupled, the NFC module 180 may operate in the reader mode. In the case where the verification on the accessory apparatus 400 is completed, when an event occurs, the NFC module 180 may enter the first mode (e.g., the accessory mode) in order to thereby transmit the first RF signal to the accessory apparatus 400 through the NFC antenna 182 for the first period of time. The NFC module 180 may periodically transmit, to the accessory apparatus 400, an event checking signal (e.g., a polling signal) through the NFC antenna 182 in order to check the event that occurs in the accessory apparatus 400. The NFC module 180 may receive the second RF signal from the accessory apparatus 400 through the NFC antenna 182 in response to the event checking signal.

According to an embodiment, if the external electronic device is detected at least one selected timing for the first side period of time, the NFC module 180 may switch to the second mode (e.g., the card emulation mode) in order to thereby allow the external electronic device to read the data of the NFC module 180.

According to an embodiment, if the external electronic device is not detected while the transmission of the first RF signal is stopped in the first mode, the NFC module 180 may maintain the first mode (e.g., the accessory mode) in order to thereby perform the transmission of the power and data to the accessory apparatus 400.

The first external electronic device 102 and the second external electronic device 104 may be the same as, or different from, the electronic device 101 in its type.

According to various embodiments, all or some of the operations that are executed in the electronic device 101 may be executed by one or more other external devices (e.g., the first external electronic device 102, the second external electronic device 104, or the server 106).

According to an embodiment, in the case where the electronic device 101 executes a specific function or service automatically or by request, the electronic device 101 may make a request to the other external devices (e.g., the first electronic device 102, the second electronic device 104, or the server 106) for at least some of the functions related to the same additionally or instead of executing the same by itself. The other electronic devices (e.g., the first electronic device 102, the second electronic device 104, or the server 106) may execute the requested function or additional function, and may deliver the result thereof to the electronic device 101. The electronic device 101 may provide the requested function or service by providing the received result or by additionally processing the same. To this end, for example, cloud computing, distributed computing, or client server computing technology may be used.

The NFC antenna 182 may transmit the verification request signal to the accessory apparatus 400, and may receive the verification response signal from the accessory apparatus 400. The NFC antenna 182 may transmit the first RF signal to the accessory apparatus 400, and may transmit the event checking signal to the accessory apparatus 400. The NFC antenna 182 may receive the second RF signal from the accessory apparatus 400.

The sensor module 190 may determine whether or not the electronic device 101 is coupled to, or detached from, the accessory apparatus 400, and if the electronic device 101 is detected to be coupled to the accessory apparatus 400, the sensor module 190 may transmit a detection signal to the processor 120.

According to various embodiments, the electronic device may include a housing, a display that is exposed through the first portion of the housing, a conductive pattern that is positioned in the housing or forms a portion of the housing, a wireless communication circuit that is configured to be electrically connected with the conductive pattern and to support a short-range wireless communication protocol, a processor that is electrically connected with the display and the wireless communication circuit, and a memory that is electrically connected with the processor. Here, the memory may store instructions that allow, when being executed, the processor to operate the wireless communication circuit in the first mode in which the first data is provided to the first type of external electronic device for the first period of time, operate the wireless communication circuit in the second mode in which the second type of external electronic device is allowed to read the second data for the second period of time following the first period of time, allow the wireless communication circuit to detect the second type of external electronic device at one or more selected timings during the first period of time, and when the second type of external electronic device is detected, allow the wireless communication circuit to switch to the second mode.

According to various embodiments, the electronic device may include a housing, a display that is exposed through the first portion of the housing, a conductive pattern that is positioned in the housing or forms a portion of the housing, a wireless communication circuit that is configured to be electrically connected with the conductive pattern and to support an NFC protocol, a processor that is electrically connected with the display and the wireless communication circuit, and a memory that is electrically connected with the processor. Here, the wireless communication circuit may operate in the first mode for the first period of time, operate in the second mode in which the external electronic device is allowed to read data for the second period of time following the first period of time, detect the external electronic device for the first period of time, and when the external electronic device is detected, switch to the second mode.

According to various embodiments, the data may contain payment-related information.

According to various embodiments, the first mode may be a reader mode of the NFC protocol, and the second mode may be a card mode of the NFC protocol.

According to various embodiments, the wireless communication circuit may detect the external electronic device by using an impulse signal.

According to various embodiments, the wireless communication circuit may switch to the third mode in order to thereby detect the external electronic device.

Figure 3:
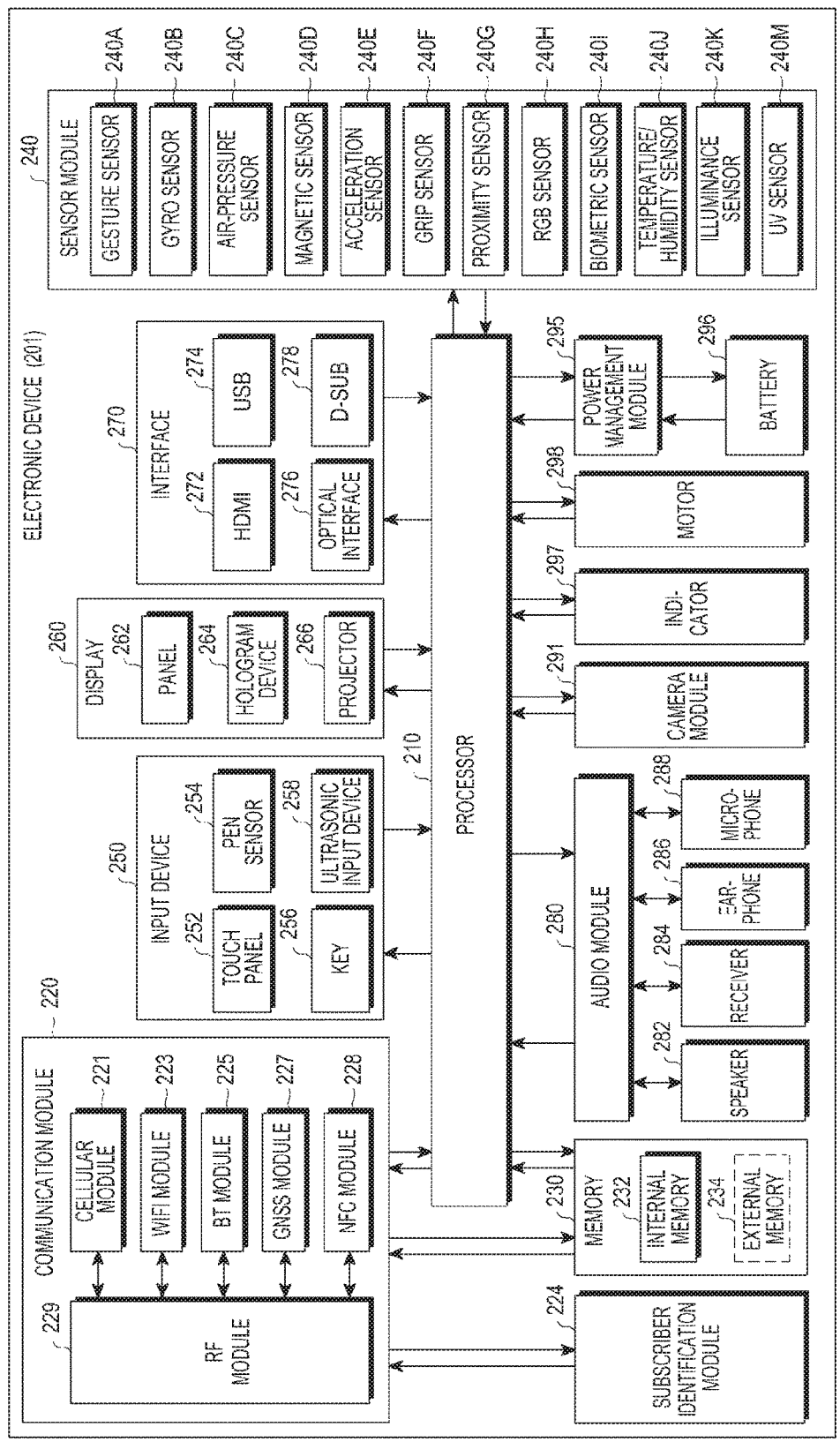
FIG. 3 is a block diagram of an electronic device, according to an embodiment of the present disclosure.

FIG. 3 is a block diagram of an electronic device, according to an embodiment of the present disclosure.

Referring to FIG. 3, the electronic device 201, for example, may include all or some of the electronic device 101 shown in FIG. 1. The electronic device 201, for example, may include one or more processors (e.g., APs) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210, for example, may control a multitude of hardware or software elements connected with the processor 210, and may perform the processing of various pieces of data and a calculation by driving an operating system or application programs. The processor 210 may be implemented by, for example, a system on chip (SoC). According to an embodiment, the processor 210 may further include a graphic processing unit (GPU) and/or an image signal processor. The processor 210 may include at least some (e.g., a cellular module 221) of the elements shown in FIG. 2. The processor 210 may load commands or data received from one or more other elements (e.g., a non-volatile memory) to a volatile memory to then process the same, and may store the result data in a non-volatile memory.

The communication module 220 may have the same or a similar configuration as the communication interface 170. The communication module 220, for example, may include the cellular module 221, a WiFi module 223, a BT module 225, a GNSS module 227, an NFC module 228, and an RF module 229. The cellular module 221, for example, may provide services of voice calls, video calls, text messaging, or the Internet through communication networks. According to an embodiment, the cellular module 221 may perform identification and verification of the electronic device 201 in communication networks by using the subscriber identification module (e.g., a subscriber identity module (SIM) card) 224. According to an embodiment, the cellular module 221 may perform at least some of the functions provided by the processor 210. According to an embodiment, the cellular module 221 may include a CP. According to another embodiment, at least some (e.g., two or more) of the cellular module 221, the WiFi module 223, the BT module 225, the GNSS module 227, or the NFC module 228 may be included in one integrated chip (IC) or one IC package. The RF module 229, for example, may transmit and receive communication signals (e.g., RF signals). The RF module 229 may include, for example, a transceiver, a power amp module (PAM), a frequency filter, a low noise amplifier (LNA), antennas, or the like. According to another embodiment, at least one of the cellular module 221, the WiFi module 223, the BT module 225, the GNSS module 227, and the NFC module 228 may transmit and receive RF signals through separated RF modules. The SIM 224 may include a card or an embedded SIM, which adopt a SIM, and may include inherent identification information {e.g., an integrated circuit card identifier (ICCID)} or subscriber information {e.g., an international mobile subscriber identity (IMSI)}.

The memory 230 (e.g., the memory 130) may include an internal memory 232 or an external memory 234. The internal memory 232, for example, may include at least one of volatile memories (e.g., a dynamic random access memory (DRAM), a static RAM (SRAM), a synchronous dynamic RAM (SDRAM), or the like) or non-volatile Memories {e.g., a one time programmable read-only memory (OTPROM), a programmable ROM (PROM), an erasable ROM (EPROM), an electrically erasable rom) EEPROM, a mask ROM, a flash ROM, a flash memory, a hard drive, a solid state drive (SSD), or the like}. The external memory 234 may include a flash drive, for example, compact flash (CF), secure digital (SD), Micro SD, Mini SD, xD, a multi-media card (MMC), a memory stick, or the like. The external memory 234 may be functionally and/or physically connected with the electronic device 201 through various interfaces.

The sensor module 240, for example, may measure physical quantities and may detect the operation state of the electronic device 201 to thereby convert the measured or detected information to electric signals. The sensor module 240 may include at least one of, for example, a gesture sensor 240A, a gyro sensor 240B, an air-pressure sensor 240C, a magnetic sensor 240D, an acceleration sensor 240E, a grip sensor 240F, a proximity sensor 240G, a color sensor 240H {e.g., a red green blue (RGB) sensor}, a biometric sensor 240I, a temperature/humidity sensor 240J, an illuminance sensor 240K, or an ultra violet (UV) sensor 240M. Alternatively or additionally, the sensor module 240 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240 in order to thereby control the processor 210 while the processor 210 is in a sleep mode.

The input device 250, for example, may include a touch panel 252, a (digital) pen sensor 254, keys 256, or an ultrasonic input device 258. The touch panel 252 may use at least one of, for example, a capacitive type, a pressure sensitive type, an infrared type, or an ultrasonic type. In addition, the touch panel 252 may further include a control circuit. The touch panel 252 may further include a tactile layer in order to thereby provide a user with a tactile reaction. For example, the (digital) pen sensor 254 may be a part of the touch panel, or may include a separate recognition sheet. The keys 256 may include, for example, physical buttons, optical keys, or a keypad. The ultrasonic input device 258 detects ultrasonic waves generated by input means through a microphone (e.g., a microphone 288) to thereby identify data corresponding to the detected ultrasonic waves.

The display 260 (e.g., the display 160) may include a panel 262, a hologram device 264, a projector 266, and/or a control circuit for control the elements. The panel 262 may be implemented to be, for example, flexible, transparent, or wearable. The panel 262 may be configured with the touch panel 252 as one or more modules. According to an embodiment, the panel 262 may include a pressure sensor (or a force sensor) to measure the strength of the user's touch pressure. The pressure sensor may be implemented to be integral with the touch panel 252, or may be implemented to be one or more sensors separately from the touch panel 252. The hologram device 264 may display 3D images in the air by using interference of light. The projector 266 may display images by projecting light onto a screen. The screen may be positioned, for example, inside or outside the electronic device 201. The interface 270 may include, for example, an HDMI 272, a USB 274, an optical interface 276, or a D-subminiature (D-sub) 278. The interface 270, for example, may be included in the communication interface 170 shown in FIG. 1. Additionally or alternatively, the interface 270 may include, for example, a mobile high-definition link (MHL) interface, a SD card/MMC interface or an infrared data association (IrDA) standard interface.

The audio module 280, for example, may convert a sound into an electric signal, and vice versa. At least some elements of the audio module 280, for example, may be included in the input/output interface or application programming interface (API) 145 shown in FIG. 2. For example, the audio module 280 may process sound information that is input, or output, through a speaker 282, a receiver 284, earphones 286, or a microphone 288. The camera module 291 is a device for photographing still and moving images, and, according to an embodiment, the camera module 291 may include one or more image sensors (e.g., a front sensor or a rear sensor), lenses, an image signal processor (ISP), or a flash (e.g., an LED or a xenon lamp). The power management module 295 may manage the power of the electronic device 201. According to an embodiment, the power management module 295 may include a power management integrated circuit (PMIC), a charger integrated circuit (IC), or a battery or fuel gauge. The PMIC may be implemented by a wired charging type and/or a wireless charging type. The wireless charging type may encompass, for example, a magnetic resonance type, a magnetic induction type, or an electromagnetic wave type, and additional circuits for wireless charging (such as coil loops, resonance circuits, or rectifiers) may be provided. The battery gauge may measure, for example, the remaining power of the battery 296, a charging voltage and current, or temperature. The battery 296 may include, for example, a rechargeable battery and/or a solar battery.

The indicator 297 may display a specific state (for example, the booting state, the message state, or the charging state) of the electronic device 201 or a part thereof (e.g., the processor 210). The motor 298 may convert an electric signal to a mechanical vibration, and may generate a vibration or a haptic effect. The electronic device 201 may include a mobile-TV supporting device (e.g., a GPU) that is able to process media data according to standards {for example, digital multimedia broadcasting (DMB), digital video broadcasting (DVB), or mediaFlo™}. Each of the above-described component elements of hardware according to the present disclosure may be configured with one or more components, and the names of the corresponding component elements may vary based on the type of electronic device. According to various embodiments, the electronic device (e.g., the electronic device 201) does not include some elements or further include additional elements. Some of elements are coupled to constitute one object but the electronic device may perform the same functions as those which the corresponding elements have before being coupled to each other.

Figure 4:
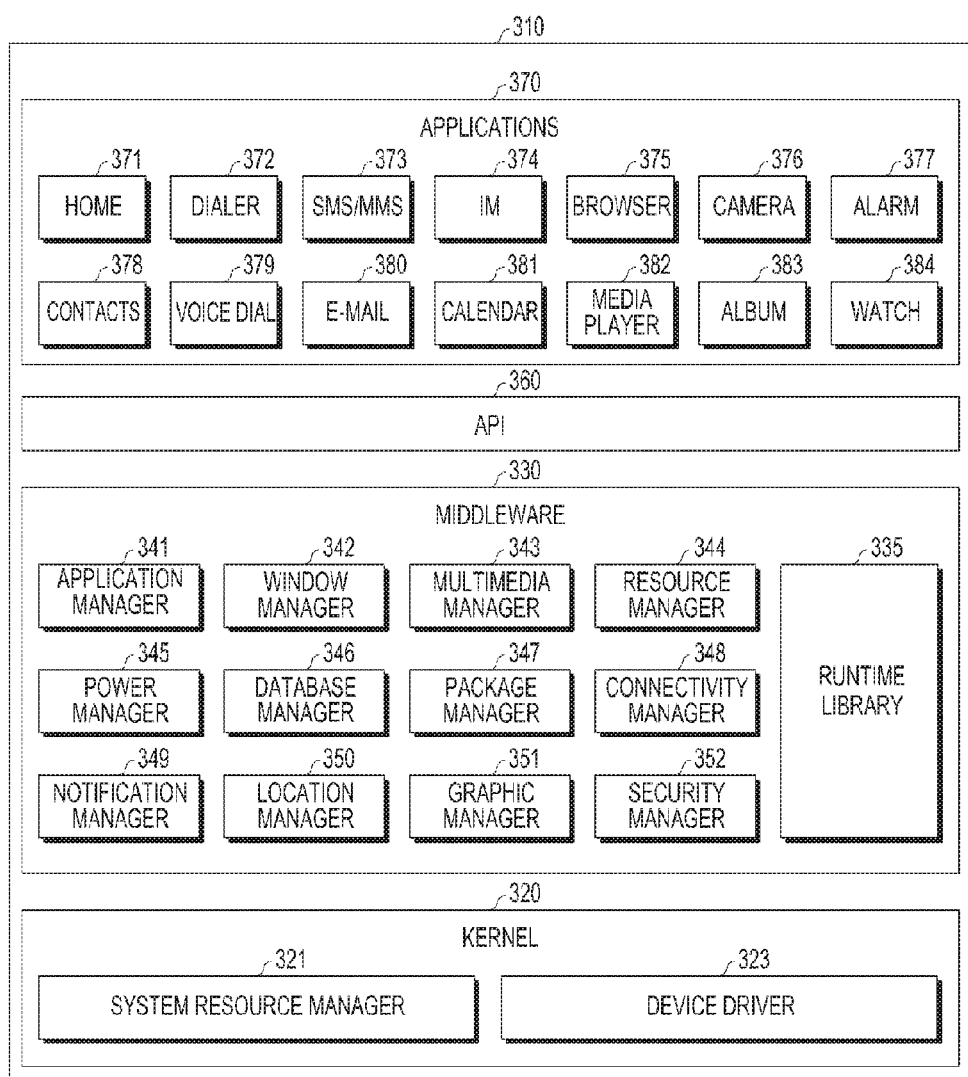
FIG. 4 is a block diagram of a program module, according to an embodiment of the present disclosure.

FIG. 4 is a block diagram of a program module, according to an embodiment of the present disclosure.

Referring to FIG. 4, the program module 310 (e.g., the programs 140) may include an operating system for controlling resources that are related to the electronic device (e.g., the electronic device 101) and/or various applications (e.g., the applications 147) that are executed under the operating system. The operating system, for example, may include Android™, iOS™, Windows™, Symbian™, Tizen™, or Bada™. The program module 310 may include a kernel 320 (e.g., the kernel 141), middleware 330 (e.g., the middleware 143), an API 360 (e.g., the API 145), and/or applications 370 (e.g., the application programs 147). At least some of the program module 310 may be pre-loaded in the electronic device, or may be downloaded from external electronic devices (e.g., the electronic devices 102 and 104, or the server 106).

The kernel 320, for example, may include a system resource manager 321 and/or a device driver 323. The system resource manager 321 may perform control, allocation, or collection of the system resources. According to an embodiment, the system resource manager 321 may include, for example, a process management unit, a memory management unit, or a file system management unit. The device driver 323 may include, for example, a display driver, a camera driver, a BT driver, a common memory driver, a USB driver, a keypad driver, a Wi-Fi driver, an audio driver, or an inter-process communication (IPC) driver. The middleware 330, for example, may provide functions that are required in common for the applications 370, or may provide the applications 370 with various functions through the API 360 in order to allow the applications 370 to effectively use limited system resources in the electronic device. According to an embodiment, the middleware 330 may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run time library 335, for example, may include a library module that is used by a compiler in order to add new functions through programming languages while the applications 370 are executed. The run time library 335 may perform the management of an input/output, the management of a memory, or processing of an arithmetic function. The application manager 341, for example, may manage a life cycle of each application 370. The window manager 342 may manage a graphic user interface (GUI) resource that is used in the screen. The multimedia manager 343 may identify formats that are necessary for reproducing various media files, and may perform encoding or decoding of media files by using a codec corresponding to each format. The resource manager 344 may manage source codes of the applications 370 or a storage space of the memory. The power manager 345, for example, may manage the capacity of a battery or power, and may provide power information necessary for the operation of the electronic device. According to an embodiment, the power manager 345 may inter-work with a basic input/output system (BIOS). The database manager 346, for example, may create, retrieve, or change a database that is to be used in the applications 370. The package manager 347 may manage the installation or updating of the applications that are distributed in the form of a package file.

The connectivity manager 348, for example, may manage a wireless connection. The notification manager 349 may provide the user with events, such as received messages, appointments, or proximity notifications. The location manager 350, for example, may manage location information of the electronic device. The graphic manager 351, for example, may manage graphic effects to be provided to the user or user interfaces related thereto. The security manager 352, for example, may provide the system security or user verification. According to an embodiment, the middleware 330 may include a telephony manager for managing a function of voice call or a function of video call of the electronic device, or may include a middleware module that is able to form a combination of the functions of the above-described elements. According to an embodiment, the middleware 330 may provide a module that is specialized according to the type of operating system. The middleware 330 may dynamically exclude some of the existing elements, or may add new elements. The API 360, for example, may be a group of API programming functions, and may be provided with a different configuration according to an operating system. For example, one set of APIs may be provided to each platform in the case of Android or iOS, and two or more sets of APIs may be provided to each platform in the case of Tizen.

The applications 370, for example, may include a home application 371, a dialer application 372, an short message service (SMS)/multi-media message service (MMS) application 373, an instant messaging application 374, a browser application 375, a camera application 376, an alarm application 377, a contact application 378, a voice dial application 379, an e-mail application 380, a calendar application 381, a media player application 382, an album application 383, a watch application 384, a healthcare application (e.g., measuring the amount of exercise or blood glucose), an environmental information (e.g., atmospheric pressure, humidity, or temperature information) providing application. According to an embodiment, the applications 370 may include an information-exchange application that is able to support the exchange of information between the electronic device and external electronic devices. The information-exchange application, for example, may include a notification relay application for relaying specific information to the external electronic devices or a device management application for managing the external electronic devices. For example, the notification relay application may transfer notification information that is generated in other applications of the electronic device to external electronic devices, or may receive notification information from the external electronic devices to then provide the same to the user. The device management application, for example, may install, delete, or update functions {e.g., turning on and off the external electronic device (or some elements) or adjusting the brightness (or resolution) of a display} of the external electronic device that communicates with the electronic device, or may install, delete, or update applications that are executed in the external electronic device. According to an embodiment, the applications 370 may include applications that are designated according to the attribute (e.g., the healthcare application of a mobile medical device) of the external electronic device. According to an embodiment, the applications 370 may include applications that are received from the external electronic devices. At least some of the program module 310 may be implemented (e.g., executed)

by software, firmware, hardware (e.g., the processor 210), or a combination thereof, and may include modules, programs, routine command sets, or a processor for executing one or more functions.

The term "module" as used herein includes a unit that includes hardware, software, or firmware and may be used interchangeably with the term, for example, "logic", "logical block, or "circuit". The "module" may be an integrated part, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which are stored a computer-readable storage medium (e.g., the memory 130) in the form of a program module. When the instruction is executed by a processor (e.g., the processor 120), the processor may perform a function corresponding to the instruction. The computer-readable storage medium may include a hard disk, a floppy disk, a magnetic medium (e.g., a magnetic tape), an optical media (e.g., compact disc read-only memory CD-ROM, DVD), a magneto-optical media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 5:
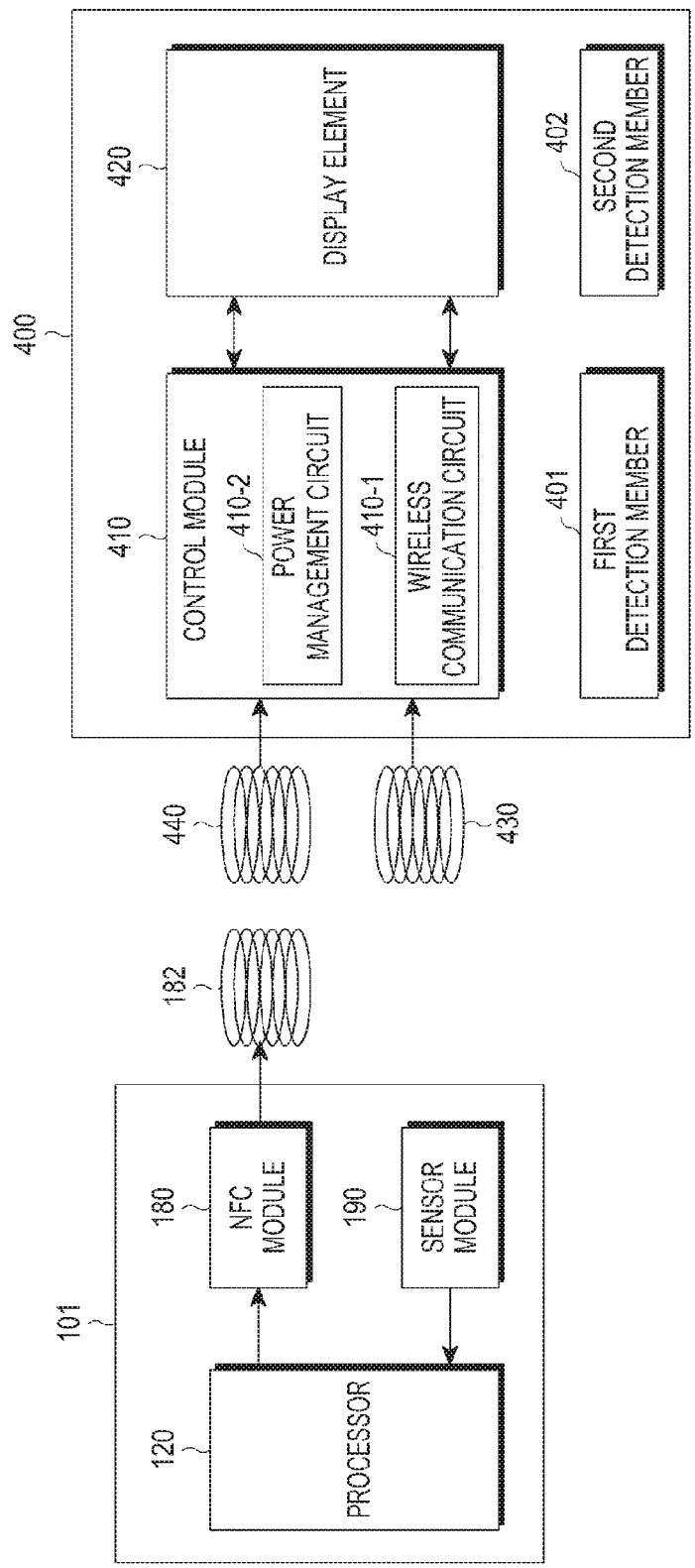
FIG. 5 is a block diagram of an electronic device and an accessory apparatus, according to an embodiment of the present disclosure.

FIG. 5 is a block diagram of an electronic device and an accessory apparatus, according to an embodiment of the present disclosure.

Referring to FIG. 5, the electronic device 101 may include an NFC module 180, a processor 120, a sensor module 190, or an NFC antenna 182.

According to an embodiment, the NFC module 180 may perform the transmission and reception of signals between the accessory apparatus 400 and external electronic devices by using a short-range wireless communication protocol (e.g., an NFC protocol). For example, the NFC module 180 may operate in the first mode (e.g., the accessory mode) for the first period of time according to the occurrence of an event in order to thereby transmit, to the accessory apparatus 400, the first RF signal that contains the first power for activating the accessory apparatus 400 and data to be displayed. The event may include the reception of a call, the reception of a message, a power-key input, reproduction of music, an alarm, a schedule, or a timer.

According to an embodiment, the NFC module 180 may transmit, to the accessory apparatus 400, a verification (or an authentication) request signal that contains the second power to request the verification on the accessory apparatus 400 through the NFC antenna 182, and may receive a verification response signal from the accessory apparatus 400. The NFC module 180 may include a processor for processing data that is transmitted and received through the NFC module 180. The verification request signal and the first RF signal may be the same.

According to an embodiment, the NFC module 180 may receive, from the processor 120, a command to detect the presence of an external electronic device at one or more selected timings for the first period of time (e.g., during the operation in the first mode). The NFC module 180 may transmit a request signal to the accessory apparatus 400 according to the command of the processor 120. If a response signal is not received from the accessory apparatus 400 within a predetermined time, or if a response signal that contains error data is received, the NFC module 180 may transmit the response to the command to the processor 120. For example, if a response signal is not received from the accessory apparatus 400 within a predetermined time, or if a response signal that contains error data is received, the NFC module 180 may determine that the external electronic device exists. If it is determined that the external electronic device exists, the NFC module 180 may transmit, to the processor 120, a response indicating that the external electronic device exists. The NFC module 180 may switch to the second mode (e.g., the card emulation mode of the NFC protocol) for the second period of time under the control of the processor 120.

According to an embodiment, the NFC module 180 may stop the transmission of the first RF signal at one or more selected timings for the first period of time, and may determine whether or not the external electronic device exists. If it is determined that the external electronic device exists, the NFC module 180 may transmit, to the processor 120, a signal that indicates the presence of the external electronic device, and may operate in the second mode (e.g., the card emulation mode of the NFC protocol) for the second period of time under the control of the processor 120. For example, when a request signal for requesting data is received from the external electronic device, the NFC module 180 may transmit a response signal to the external electronic device. If the request signal contains power, the NFC module 180 may transmit the response signal of the NFC module 180 to the external electronic device by using the received power. Alternatively, if the request signal does not contain power, the NFC module 180 may transmit the response signal that contains the data of the NFC module 180 to the external electronic device by using the power of the electronic device 101.

According to an embodiment, when the operation of the NFC module 180 with respect to the external electronic device is completed, the NFC module 180 may switch to the standby mode (or the search mode) or to the first mode under the control of the processor 120.

According to an embodiment, the NFC module 180 may periodically transmit, to the accessory apparatus 400, an event checking signal to check the occurrence of an event of the accessory apparatus 400 through the NFC antenna 182, and may receive the second RF signal from the accessory apparatus 400 in response to the event checking signal.

The processor 120, for example, may control a multitude of hardware or software elements that are connected with the processor 120, and may perform the processing of a variety of data and a calculation, by driving an operating system or application programs. The processor 120 may be implemented by, for example, a SoC. The processor 120 may further include a GPU and/or an image signal processor.

According to an embodiment, when a detection signal detecting that the electronic device 101 has been coupled to the accessory apparatus 400 is received from the sensor module 190 that detects the first detection member 401, the processor 120 may transmit, to the accessory apparatus 400, a verification request signal that contains the second power to perform the verification with the accessory apparatus 400 through the NFC module 180. The verification with the accessory apparatus 400 may be the genuineness verification in order to determine whether or not the accessory apparatus 400 is genuine. The second power may have the amount of power, which is used to perform the verification between the electronic device 101 and the accessory apparatus 400. For example, the verification operation may be performed periodically or when configured events (e.g., the coupling of the electronic device 101 to the accessory apparatus 400, charging, turning on/off, etc.) are detected.

According to an embodiment, when a verification response signal is received from the accessory apparatus 400 in response to the verification request signal, the processor 120 may perform the verification with respect to the accessory apparatus 400. As a result of the verification, if the accessory apparatus 400 is acceptable (or genuine), the processor 120 may determine whether the front cover portion of the accessory apparatus 400 is open or closed, and if the front cover portion is closed, the processor 120 may determine whether or not an event for supplying the first power to the accessory apparatus 400 occurs. For example, the processor 120 may detect, through the sensor module 190, the second detection member 402 that is provided in at least a part of the front cover portion of the accessory apparatus 400. If the second detection member 402 is detected, the processor 120 may determine that the front cover portion is in the closed state, and if the second detection member 402 is not detected, the processor 120 may determine that the front cover portion is in the open state.

According to various embodiments, when the front cover portion of the accessory apparatus 400 is in the closed state, the electronic device 101 may switch to the standby mode. The standby mode (or the search mode) may be an operation mode in which the electronic device 101 is driven with a minimum power in order to perform the operation of detecting events, such as the reception of a call or a message, detecting the open/closed state of the front cover portion of the accessory apparatus 400, detecting the attachment and detachment of the back cover portion of the accessory apparatus 400, or detecting the presence of the external electronic device.

According to an embodiment, if the event occurs while the front cover portion of the accessory apparatus 400 is in the closed state, the processor 120 may control the NFC module 180 to operate in the first mode (e.g., the accessory mode) for the first period of time, and may transmit, to the accessory apparatus 400, the first RF signal that contains the first power and data through the NFC module 180. The first power may have the amount of power that is used in order for the accessory apparatus 400 to perform the operation related to the occurred event. The data may be information that is used to perform the operation corresponding to the event.

For example, if a message is received, the processor 120 may transmit, to the accessory apparatus 400, the first RF signal that contains data for notifying of the receipt of the message (e.g., the message content or the phone number) and the first power to be used to display the data. The accessory apparatus 400 may be driven (or operated) through the first power received in order to thereby display the data related to the received message.

According to various embodiments, the processor 120 may determine whether or not a response event to the occurred event occurs within a predetermined time after transmitting the first RF signal. The response event may be an event that is intended to detect the open state of the front cover portion of the accessory apparatus 400.

For example, if the open state of the front cover portion of the accessory apparatus 400 is detected, the processor 120 may drive (or operate) the display 160 to display the data related to the occurred event therethrough. For example, the processor 120 may display, through the display 160, a configured screen (such as a locked screen or a standby screen) that displays event-related information.

For example, if the open state of the front cover portion of the accessory apparatus 400 is not detected, the processor 120 may re-transmit, to the accessory apparatus 400, the first RF signal periodically or the predetermined number of times through the NFC antenna 182. According to this, the accessory apparatus 400 may periodically display the event-related data in order to allow the user to recognize the event that occurs in the electronic device 101.

According to an embodiment, in the case where the occurred event requires a response from the accessory apparatus 400, the processor 120 may periodically transmit, to the accessory apparatus 400, an event checking signal to check the occurrence of the response event of the accessory apparatus 400 through the NFC module 180. The event checking signal may be a polling signal. The response event of the accessory apparatus 400 may be an input event that includes a key input, a touch input, a hovering input, a dragging input, a swipe input, and a combination thereof.

According to an embodiment, if the second RF signal is received, as the response signal to the occurred event, from the accessory apparatus 400, the processor 120 may perform the operation (or function) corresponding to the second RF signal received. The response signal may be a signal according to an input that includes a key input, a touch input, a hovering input, a dragging input, a swipe input, and a combination thereof. For example, if a response signal that accepts or rejects the call reception is received according to the occurrence of a call reception event, the processor 120 may accept or reject the call reception.

According to various embodiments, the processor 120 may continue to transmit the power through the NFC antenna 182 until the response signal is received from the accessory apparatus 400.

According to an embodiment, the processor 120 may control the communication interface 170 (e.g., the NFC module 180) to detect the external electronic device (e.g., the NFC device) at one or more selected timings while transmitting the power and data to the accessory apparatus 400 (e.g., during the first mode). When the external electronic device is detected, the processor 120 may control the communication interface 170 (e.g., the NFC module 180) to operate in the second mode (e.g., the card emulation mode) for the second period of time.

For example, the processor 120 may transmit, to the communication interface 170 (e.g., the NFC module 180), a command for detecting the presence of the external electronic device at one or more selected timings. When a response indicating that the external electronic device has been detected is received from the communication interface 170 (e.g., the NFC module 180), the processor 120 may control the communication interface 170 (e.g., the NFC module 180) to operate in the second mode.

For example, the processor 120 may control the communication interface 170 (e.g., the NFC module 180) to stop the transmission of the first RF signal for detecting the presence of the external electronic device at one or more selected timings. If a signal indicating that the external electronic device has been detected is received from the communication interface 170 (e.g., the NFC module 180) while the transmission of the first RF signal is stopped, the processor 120 may control the communication interface 170 (e.g., the NFC module 180) to operate in the second mode.

According to an embodiment, when the operation of the external electronic device is completed, the processor 120 may control the NFC module 180 to operate in the standby mode (or the search mode) or in the first mode.

According to various embodiments, when the accessory apparatus 400 is coupled to the electronic device 101, in order to prevent the degradation of the NFC performance of the electronic device 101, the processor 120 may configure the first register program that optimizes the NFC function of the electronic device 101 that is not coupled to the accessory apparatus 400 and the second register program that optimizes the NFC function of the electronic device 101, which is coupled to the accessory apparatus 400 {or may store the programs in the memory (e.g., the memory 130 or 230)}. For example, if the accessory apparatus 400 is not coupled to the electronic device 101, the processor 120 may perform the operation with the accessory apparatus 400 by using the first register program, and if the accessory apparatus 400 is coupled to the electronic device 101, the processor 120 may perform the operation with the accessory apparatus 400 by using the second register program. Accordingly, it is possible to maximize the NFC performance of the electronic device 101.

The sensor module 190 may include one or more detection sensors to detect the coupling of the electronic device 101 to the accessory apparatus 400 and to detect the open state or closed state of the front cover portion of the accessory apparatus 400.

According to an embodiment, the sensor module 190 may detect whether or not the accessory apparatus 400 is coupled to the electronic device 101, and when it is detected that the accessory apparatus 400 is coupled to the electronic device 101, the sensor module 190 may transmit a detection signal to the processor 120. For example, the sensor module 190 may be provided at the position corresponding to the first detection member 401, which is used to detect whether or not the electronic device 101 is coupled to the accessory apparatus 400. The first detection member 401 may be a magnetic member or magnetic material, which has magnetism, or a contact protrusion. If the first detection member 401 is the magnetic member or magnetic material, the sensor module 190 may be a detection sensor that is able to detect the magnetic member or magnetic material. If the first detection member 401 is the contact protrusion, the sensor module 190 may be a detection sensor that is able to detect the contact of the contact protrusion.

According to an embodiment, the sensor module 190 may detect the open state or the closed state of the front cover portion of the accessory apparatus 400, and when it is detected that the front cover portion is open, the sensor module 190 may transmit a detection signal to the processor 120. For example, the sensor module 190 may be provided at the position corresponding to the second detection member 402 that is used to detect whether or not the front cover portion of the accessory apparatus 400 is open or closed. The second detection member 402 may be a magnetic member or magnetic material, which has magnetism, or a contact protrusion. If the second detection member 402 is the magnetic member or magnetic material, the sensor module 190 may be a detection sensor that is able to detect the magnetic member or magnetic material. If the second detection member 402 is the contact protrusion, the sensor module 190 may be a detection sensor that is able to detect the contact of the contact protrusion.

According to an embodiment, the NFC antenna 182 may transmit the first RF signal to the accessory apparatus 400, and may transmit an event checking signal to check the occurrence of an event in the accessory apparatus 400.

The NFC antenna 182 may receive, from the accessory apparatus 400, the second RF signal that contains a response to the event checking signal. According to an embodiment, the NFC antenna 182 may be implemented in a similar form to a first antenna 430 of the accessory apparatus 400, which receives the first power. For example, the NFC antenna 182 may be implemented in an annular shape. The first RF signal and the second RF signal may have the same frequency (e.g., a frequency in the range of 10 MHz to 14.99 MHz).

According to an embodiment, the NFC antenna 182 may transmit (or broadcast) a search signal to search for the external electronic device while transmitting the first RF signal to the accessory apparatus 400, and may receive a response signal from the searched external electronic device.

Referring to FIG. 5, the accessory apparatus 400 may include the first detection member 401, the second detection member 402, a control module 410, a display element 420, the first antenna 430, and a second antenna 440.

The first detection member 401 may be used to detect whether or not the accessory apparatus 400 is coupled to the electronic device 101. The first detection member 401 may be provided at the position corresponding to the sensor module 190.

The second detection member 402 may be used to detect whether or not the front cover portion of the accessory apparatus 400 is open or closed. The second detection member 402 may be provided at the position corresponding to the sensor module 190.

According to an embodiment, when the electronic device 101 and the accessory apparatus 400 are coupled to each other, the control module 410 may receive, from the electronic device 101, a verification request signal for the verification between the electronic device 101 and the accessory apparatus 400 through the first antenna 430. In response to the verification request signal, the control module 410 may transmit a verification response signal to the electronic device through the first antenna 430 in order to thereby perform the verification between the electronic device 101 and accessory apparatus 400.

When the first RF signal is received from the electronic device 101, the control module 410 may determine whether or not to operate the display element 420 based on the data contained in the first RF signal. The control module 410 may operate the display element 420 by using the power contained in the first RF signal based on at least some of the determination, and may display the data contained in the first RF signal through the display element 420.

According to an embodiment, when the first RF signal is received through the first antenna 430 and the second antenna 440, the control module 410 may transfer the power contained in the first RF signal to the display element 420 to then be activated. The control module 410 may transmit the data to the activated display element 420 in order to thereby display data-related information through the display element 420. In the case where the event checking signal to check the occurrence of an event of the accessory apparatus 400 is periodically received from the electronic device 101, if the event does not occur, the control module 410 may generate the second RF signal that contains information indicating that the event has not occurred, and may transmit the same to the electronic device 101 in response to the event checking signal. If the event has occurred, the control module 410 may transmit, to the electronic device 101, the second RF signal that contains input data that is input according to the occurrence of the event through the first antenna 430.

According to an embodiment, the control module 410 may include a wireless communication circuit 410-1 and a power management circuit 410-2. For example, the wireless communication circuit 410-1 may be the NFC module.

According to an embodiment, the wireless communication circuit 410-1 may receive a verification request signal from the electronic device 101 through the first antenna 430 according to the coupling of the electronic device 101 to the accessory apparatus 400, and may transmit a verification response signal to the electronic device 101 in response to the verification request signal in order to thereby perform the verification with respect to the electronic device 101.

According to an embodiment, if the accessory apparatus 400 is acceptable, and if an event for the transmission of power to the accessory apparatus 400 and for the data display occurs in the electronic device 101, the power management circuit 410-2 may receive, from the electronic device 101, the first power that is contained in the first RF signal through the second antenna 440. In addition, the wireless communication circuit 410-1 may receive, from the electronic device 101, the data contained in the first RF signal through the first antenna 430. For example, if the occurred event is the call reception, the wireless communication circuit 410-1 may receive the data related to the call reception (e.g., a configuration value indicating the call reception and display data corresponding to the configuration value) from the electronic device 101.

According to an embodiment, the wireless communication circuit 410-1 may transmit, to the power management circuit 410-2, a control signal to supply the first power to the display element 420, and the power management circuit 410-2 may transmit the first power to the display element 420 according to the control signal of the wireless communication circuit 410-1. When the display element 420 is activated, the wireless communication circuit 410-1 may transmit data to the display element 420 so that the display element 420 displays data-related information by using the data.

According to an embodiment, the wireless communication circuit 410-1 may periodically receive the event checking signal from the electronic device 101 through the first antenna 430 to then be transferred to the display element 420, and may receive, from the display element 420, the second RF signal in response to the event checking signal to then be transferred to the electronic device 101 through the first antenna 430. The event checking signal may be a polling signal. The second RF signal may contain the data that indicates whether or not the event occurs or the input data that is input in accordance with the occurrence of the event.

The display element 420 may be activated by using the power that is received from the power management circuit 410-2, and may perform the operation (or function) based on the data that is received from the wireless communication circuit 410-1. For example, the display element 420 may display information on the event by using the data (e.g., text, numbers, special characters, emoticons, etc.) that is receive from the electronic device 101, or display information reflecting one or more of a dimming effect, an animation effect, or an effect of moving up, down, left, or right. For example, the data may contain an image to be displayed, the effect applied to the image, or the time for displaying the image.

According to an embodiment, the display element 420 may include a plurality of light-emitting elements. The light-emitting elements may be included in the display element 420 in various forms (e.g., a matrix form). The light-emitting elements may be LEDs, OLEDs, EPDs (electrophoretic displays), LCDs, or E-ink (electronic ink).

According to an embodiment, the display element 420 may adopt an input device that receives the input data according to the occurrence of an input event in order to thereby identify whether or not the input event occurs. The input device, for example, may include a touch panel, a (digital) pen sensor, the keys, or an ultrasonic input device.

According to an embodiment, when the event checking signal is received, the display element 420 may identify whether or not the input event occurs in order to thereby transmit the input event to the wireless communication circuit 410-1. For example, the input data may contain the acceptance or rejection of the event (e.g., the call reception) that has occurred in the electronic device 101.

According to an embodiment, the first antenna 430 may receive, from the electronic device 101, a verification request signal to perform the verification between the electronic device 101 and the accessory apparatus 400, and may transmit a verification response signal to the electronic device 101. Alternatively, the first antenna 430 may receive the first RF signal from the electronic device 101, and may transmit, to the electronic device 101, the second RF signal that contains a response according to the occurrence of the event of the accessory apparatus 400. According to an embodiment, the first antenna 430 may be designed to have the same frequency band (e.g., 10 MHz to 14.99 MHz) as the resonance frequency of the NFC antenna 182 of the electronic device 101.

According to an embodiment, the second antenna 440 may receive the first RF signal from the electronic device 101. The second antenna 440 may be implemented in a similar form to the NFC antenna 182 of the electronic device 101. For example, the second antenna 440 may be implemented in an annular shape.

According to an embodiment, the second antenna 440 may be designed to have a specific frequency band in order to minimize the resonance frequency shifting due to the coupling with the NFC antenna 182 of the electronic device 101 when the electronic device 101 is coupled to the accessory apparatus 400. For example, the specific frequency band may be any frequency band (for example, 15 MHz to 30 MHz) in order to minimize the resonance frequency shifting due to the coupling with the NFC antenna 182 of the electronic device 101.

According to various embodiments, the electronic device 101 and the accessory apparatus 400 may operate by using modulation (e.g., the S-type of protocol) to prevent the electronic device 101 from recognizing the first antenna 430 and the second antenna 440 of the accessory apparatus 400 as being general NFC tags (or NFC antennas).

For example, if an external NFC tag is detected, the electronic device 101 may perform the operation with the external NFC tag by using an NFC standard protocol (e.g., the A-type, B-type, or F-type of protocol). When the accessory apparatus 400 is coupled, the electronic device 101 may detect the first detection member 401 that is provided in the accessory apparatus 400, and may perform the operation with the accessory apparatus 400 by using other specific NFC protocols (e.g., the S-type of protocol) that are difference from the NFC standard protocol.

Accordingly, since the electronic device 101 performs the operations by using the different protocols from the external NFC tag and the accessory apparatus 400, the malfunction of the accessory apparatus 400 may be reduced. In addition, since there is no RF field change of the accessory apparatus 400 after the accessory apparatus 400 is coupled to the electronic device 101, the electronic device 101 may not perform the operation of recognizing the NFC tag.

Figure 6:
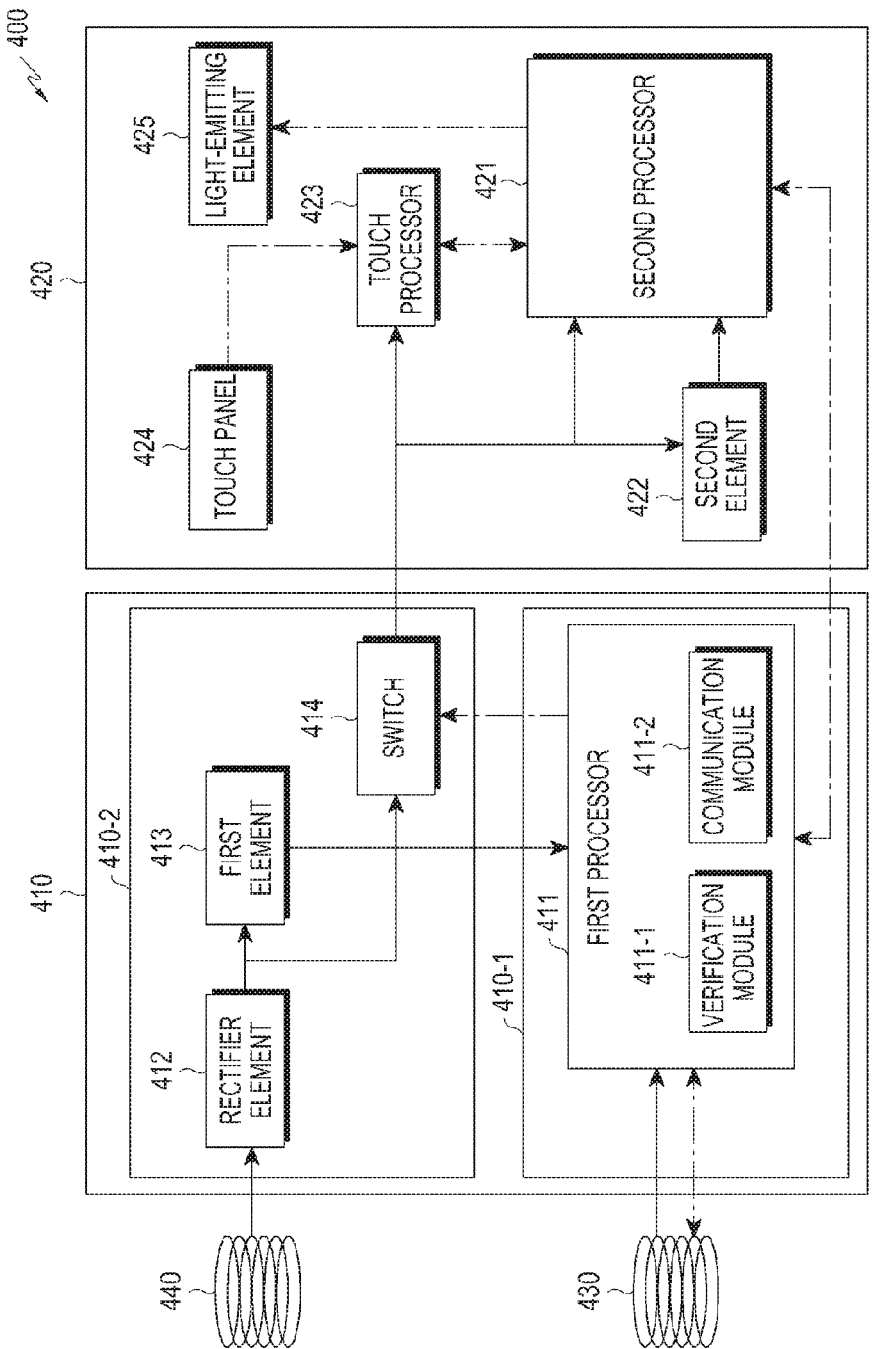
FIG. 6 is a block diagram of an accessory apparatus, according to an embodiment of the present disclosure.

FIG. 6 is a block diagram of an accessory apparatus, according to an embodiment of the present disclosure.

Referring to FIG. 6, the accessory apparatus 400 may include the control module 410 that includes the wireless communication circuit 410-1 and the power management circuit 410-2, the display element 420, the first antenna 430, and the second antenna 440.

The wireless communication circuit 410-1 may include the first processor 411 that includes a verification module 411-1 and a communication module 411-2, and the power management circuit 410-2 may include a rectifier element 412, the first element 413, and a switch 414.

When a verification request signal is received from the electronic device 101 through the first antenna 430, the first processor 411 may transmit a verification request response signal to the electronic device 101 in order to thereby perform the verification with the electronic device 101. The verification request signal may contain the second power that is used for the first processor 411 to perform the verification.

For example, if the accessory apparatus 400 is coupled to the electronic device 101 while the power is not supplied, the sensor module 190 of the electronic device 101 may detect the first detection member 401 of the accessory apparatus 400 shown in FIG. 5 in order to thereby detect whether or not the accessory apparatus 400 is coupled to the electronic device 101. When the accessory apparatus 400 is coupled, the electronic device 101 may transmit, to the accessory apparatus 400, a verification request signal in order to verify whether or not the accessory apparatus 400 is genuine.

The accessory apparatus 400 may transmit a verification response signal to the electronic device 101 in response to the verification request signal, and when the verification response signal is received, the electronic device 101 and the accessory apparatus 400 may perform the verification with each other.

According to an embodiment, when the first power of the first RF signal received from the electronic device 101 through the second antenna 440, the first processor 411 may control the switch 414 such that the received first power is transmitted to the display element 420. For example, the first processor 411 may turn on the switch 414 in order to thereby transfer the power to display element 420 through the same. If the power is not received from the electronic device 101, the electronic device 101 may turn off the switch 414 in order to thereby minimize the influence of the antenna of the accessory apparatus 400.

When the data of the first RF signal is received through the first antenna 430, the first processor 411 may transmit the received data to the display element 420.

According to an embodiment, when an event checking signal to check the occurrence of an event (e.g., the occurrence of a response event or the occurrence of an input event) is received from the electronic device 101 through the first antenna 430, the first processor 411 may transmit the event checking signal to the display element 420. When a response to the event checking signal is received from the display element 420, the first processor 411 may transmit the second RF signal that contains the response to the electronic device 101 through the first antenna 430.

According to an embodiment, when a verification request signal is received from the electronic device 101, the verification module 411-1 may transmit a verification response signal to the electronic device 101 through the first antenna 430 in response to the verification request signal, and may perform the verification with respect to the electronic device 101.

According to an embodiment, when the first power that is input through the second antenna 440 is rectified through the rectifier element 412 to then be transmitted to the switch 414, the communication module 411-2 may control the power of the switch 414 to supply the rectified first power to the display element 420.

According to an embodiment, when an event checking signal is received from the electronic device 101 through the first antenna 430, the communication module 411-2 may transfer the event checking signal to the display element 420. When a response to the event checking signal is received from the display element 420, the communication module 411-2 may transmit, to the electronic device 101, the second RF signal that contains the response through the first antenna 430.

According to an embodiment, the rectifier element 412 may convert (or rectify) the first power received through the second antenna 440 from the alternating current (AC) to the direct current (DC) to then be transmitted to the first element 413 or the switch 414.

The first element 413 may change the voltage of the first power to a specific voltage to then be transmitted to the first processor 411. According to an embodiment, the first element 413 may change the voltage of the first power to a specific voltage that is used in the first processor 411 to then be transmitted to the first processor 411. The first element 413 may be a low drop out (LDO). According to various embodiments, in the case where the voltage of the first power is a voltage that is used in the first processor 411, the first element 413 may not be provided.

The switch 414 may transmit, to the display element 420, the first power that is rectified according to the control signal of the first processor 411. According to various embodiments, the present disclosure may use a regulator that changes the first power rectified in the rectifier element 412 into the system operation power of the accessory apparatus 400, or may use an LDO that changes the same into a voltage to be used in the display element 420, instead of using the switch.

According to an embodiment, the display element 420 may include the second processor 421, the second element 422, a touch processor 423, a touch panel 424, and a light-emitting element 425.

The second processor 421 may be included in a plate or a housing of the accessory apparatus 400, and may be driven by the first power that is transmitted from the switch 414. When data is transmitted from the first processor 411, the second processor 421 may control the display element 420 to display the transmitted data. The second processor 421 may be an MCU, an AP, or an FPGA as a main control circuit (e.g., a driver circuit).

According to an embodiment, the second processor 421 may receive data (e.g., text, numbers, special characters, icons, or the like) that is contained in the first RF signal through the first processor 411, and may control the light-emitting element 425 to display the received data.

The second processor 421 may receive, from the first processor 411, an event checking signal to check the occurrence of an event of the accessory apparatus 400. The second processor 421 may transmit a response to the received event checking signal to the first processor 411.

For example, when the event checking signal is received, the second processor 421 may enquire the touch processor 423 of whether or not an input event with respect to the touch panel 424 occurs. If the input event with respect to the touch panel 424 does not occur, the second processor 421 may receive, from the touch processor 423, a response indicating that the input event has not occurred in response to the enquiry. The second processor 421 may transmit the response to the enquiry to the first processor 411.

For example, if the response to the enquiry is not received from the touch processor 423 within a predetermined time, the second processor 421 may determine that the input event with respect to the touch panel 424 has not occurred. The second processor may transmit, to the first processor 411, the response indicating that the input event has not occurred.

If an input event with respect to the touch panel 424 has occurred, the second processor 421 may receive, from the touch processor 423, a response that contains the input data that is input through the touch panel 424 in response to the enquiry, and may transmit the received response to the first processor 411. For example, the input data may indicate whether the event that has occurred in the electronic device 101 is accepted or rejected.

According to various embodiments, the second processor 421 may control the light-emitting element 425 to display data (e.g., text, numbers, or icons to indicate the call reception, the message reception, an alarm, a timer, the battery level, playing music, notification, or volume control) that is related to the occurrence of the event (e.g., the call reception, the message reception, an alarm, a timer, the battery level, playing music, notification, or volume control) of the electronic device 101. When an input data (e.g., the acceptance or rejection of the call reception, the message reception, an alarm, a timer, the battery level, playing music, notification, or volume control) for the data displayed through the touch panel 424 is received, the second processor 421 may transmit the received input data to the first processor 411.

The second element 422 may change the voltage of the first power, which is input through the switch 414, to a specific voltage that is used in the second processor 421 to then be transmitted to the second processor 421. The second element 422 may be an LDO. According to various embodiments, in the case where the voltage of the first power is a voltage that is used in the second processor 421, the second element 422 may not be provided.

According to an embodiment, the touch processor 423 may be driven by the first power that is received from the switch 414. When an enquiry about whether or not the event of the touch panel 424 occurs is received from the second processor 421, in response to the enquiry, the touch processor 423 may transmit, to the second processor 421, the data indicating whether or not the event of the touch panel 424 occurs, or the input data that is input according to the event when the input event has occurred.

According to an embodiment, in the case where the enquiry is received from the second processor 421, when the input data is not received from the touch panel 424, the touch processor 423 may transmit, to the second processor 421, the data indicating that the input event with respect to the touch panel 424 has not occurred in response to the enquiry.

According to an embodiment, in the case where the enquiry is received from the second processor 421, when the input data is received from the touch panel 424, the touch processor 423 may transmit the received input data to the second processor 421 in response to the enquiry.

The touch panel 424 may use at least one of, for example, a capacitive type, a pressure sensitive type, an infrared type, or an ultrasonic type. In addition, the touch panel 424 may further include a tactile layer in order to thereby provide a user with a tactile reaction.

According to an embodiment, when the input event has occurred, the touch panel 424 may transmit the input data for the occurred input event to the touch processor 423. According to an embodiment, the touch panel 424 may be positioned at the top or bottom of the light-emitting element 425. The touch panel 424 may be made to have the same shape as the light-emitting element 425, or may be smaller or larger than the light-emitting element 425.

The light-emitting element 425 (here, that is used as the term that includes one or more light-emitting elements) may display the data received from the electronic device 101 according to the control signal of the second processor 421. For example, the light-emitting element 425 may be an LED, an OLED, an electrophoretic display electrophoretic display (EPD), an LCD, or electronic ink (E-ink). The light-emitting element 425 may be turned on and off under the control of the second processor 421 in order to thereby display data.

According to an embodiment, the light-emitting element 425 may be turned on and off under the control of the second processor 421 in order to thereby display at least one of text, numbers, icons, or images. In addition, the light-emitting element 425 may be turned on and off under the control of the second processor 421 in order to thereby display data by reflecting one or more of a dimming effect, an animation effect, or an effect of moving up, down, left, or right.

The first antenna 430 may receive, from the electronic device 101, a verification request signal for requesting the verification on the accessory apparatus 400, and may transmit a verification response signal to the electronic device 101. The first antenna 430 may receive the data contained in the first RF signal from the electronic device 101. The first antenna 430 may receive an event checking signal from the electronic device 101, and may transmit the second RF signal as an event response signal to the electronic device 101.

The second antenna 440 may receive the first power contained in the first RF signal from the electronic device 101.

According to various embodiments, the accessory apparatus may include a housing that includes the first side that is directed in the first direction and the second side that is directed in the second direction that is the opposite direction of the first direction, a coupling member that detachably couples the housing to an external electronic device, a first conductive pattern that is configured to be positioned between the first side and the second side, and to receive the first RF signal from the external electronic device through the second side, a second conductive pattern that is configured to be positioned between the first side and the second side to be electrically separated from the first conductive pattern, and to receive the first RF signal from the external electronic device through the second side, a wireless communication circuit that is electrically connected with the first conductive pattern, and receives the first RF signal or transmits the second RF signal through the first conductive pattern, a power management circuit that is configured to be electrically connected with the second conductive pattern, and to extract power from the first RF signal, and a display element that is electrically connected with the wireless communication circuit, and is supplied with power by the power management circuit.

According to various embodiments, the first RF signal may have a different frequency from the frequency band of the second conductive pattern.

According to various embodiments, the first RF signal may have a frequency in the range of 10 MHz to 14.99 MHz.

According to various embodiments, the first conductive pattern may transmit and receive a frequency in the range of 10 MHz to 14.99 MHz, and the second conductive pattern may transmit and receive a frequency in the range of 15 MHz to 30 MHz.

According to various embodiments, the wireless communication circuit may support an NFC protocol.

According to various embodiments, the display element may include at least one of an LED, an LED display, an OLED display, an EPD, an LCD display, MEMS display, or E-ink.

According to various embodiments, the first conductive pattern may have a smaller area than the second conductive pattern.

According to various embodiments, the second conductive pattern may have an annular shape when it is viewed from above on the second side, and the first conductive pattern may be positioned, at least in part, inside the annular shape when it is viewed from above on the second side.

According to various embodiments, the wireless communication circuit may transmit a signal to perform the verification to the external electronic device after the external electronic device and the accessory apparatus are coupled to each other.

According to various embodiments, when the first RF signal is received through the first conductive pattern and the second conductive pattern, the wireless communication circuit may form an electrical path between the second conductive pattern and the display element, and may transmit, to the display element, data that is contained in the first RF signal.

According to various embodiments, the accessory apparatus may be configured to cover at least a portion of a display of the external device, and to further include a plate that is connected to the housing, and the display element may be disposed on one side of the plate.

According to various embodiments, the accessory apparatus may be included in the plate or in the housing, drive the display element, and further include a driver circuit that is electrically connected with the wireless communication circuit.

According to various embodiments, the power management circuit may convert a voltage of the first level generated by the second conductive pattern into a voltage of the second level, and may provide the converted voltage of the second level to the driver circuit.

According to various embodiments, the accessory apparatus may be connected with the display element, and may further include a touch input device that is electrically connected to the wireless communication circuit.

According to various embodiments, the wireless communication circuit may periodically receive an event checking signal to check the occurrence of an event from the external electronic device through the first conductive pattern.

According to various embodiments, the display element may transmit a response to the event checking signal to the wireless communication circuit.

According to various embodiments, the display element may include an input device for receiving input data, according to the occurrence of an event, and when the input data is received through the input device, the display element may transmit a response that contains the input data to the wireless communication circuit in response to the event checking signal, and the wireless communication circuit may transmit the second RF signal that includes the response to the external electronic device.

Figure 7A:
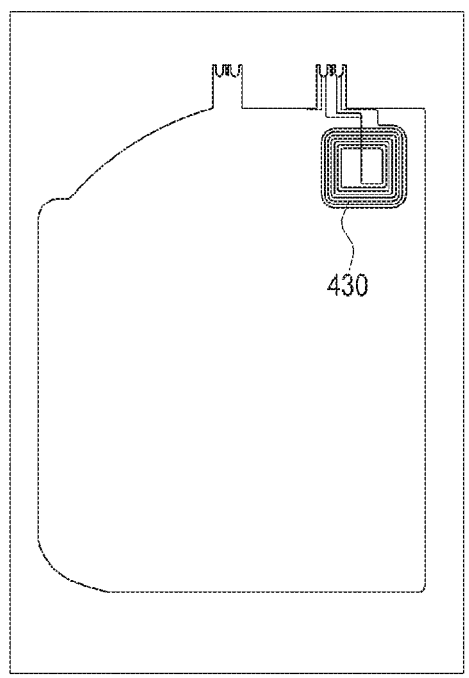
FIGS. 7A and 7B are views illustrating a first antenna and a second antenna of an accessory apparatus, according to various embodiments of the present disclosure.
Figure 7B:
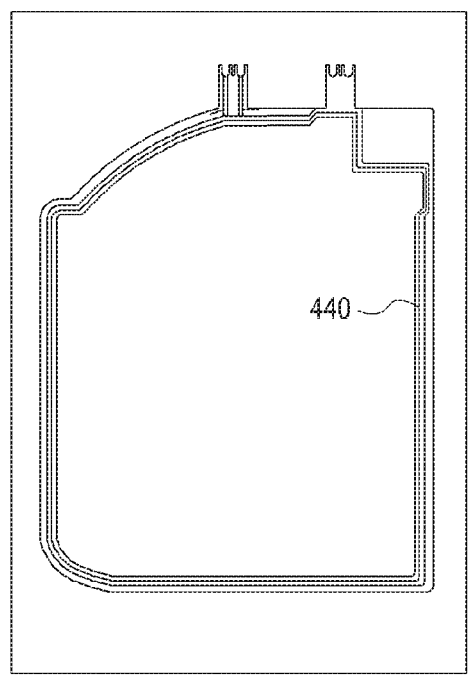

FIGS. 7A and 7B are views illustrating a first antenna and a second antenna of an accessory apparatus, according to various embodiments of the present disclosure.

Referring to FIGS. 7A and 7B, the accessory apparatus 400 may separately adopt the first antenna 430 for transmitting and receiving data and the second antenna 440 for receiving power. Alternatively, it is possible to reduce the degradation of the performance of the NFC antenna 182 of the electronic device 101 by making the first antenna 430 and the second antenna 440 different from each other in their sizes.

According to an embodiment, since electronic device 101 and the accessory apparatus 400 can transmit and receive data by using low power communication, the first antenna 430 may be designed to have a smaller size than the second antenna 440 as shown in FIG. 7A. The second antenna 440 may be designed to have the same size as, or a greater size than, the NFC antenna 182 of the electronic device 101 as shown in FIG. 7A in order to increase the power receiving efficiency.

According to an embodiment, the second antenna 440 of the accessory apparatus 400 may be designed to have a coil length of (or overlap) one more turn than the NFC antenna 182 of the electronic device 101. For example, the second antenna 440 of the accessory apparatus 400 may be designed to have a length of three turns, and the NFC antenna 182 of the electronic device 101 may be designed to have a length of two turns.

According to an embodiment, the first antenna 430 and the second antenna 440 may be configured to have separate resonant frequencies to enable the normal operation of the NFC antenna 182 of the electronic device 101 and a dual antenna (e.g., the first antenna 430 and the second antenna 440) of the accessory apparatus 400 while the NFC antenna 182 of the electronic device 101 and the dual antenna (e.g., the first antenna 430 and the second antenna 440) of the accessory apparatus 400 overlap each other according to the connection of the electronic device 101 and the accessory apparatus 400 (e.g., the coupling of the accessory apparatus 400 to the electronic device 101).

The performance of the NFC antenna 182 of the electronic device 101 may vary depending on the degree of the overlap between the NFC antenna 182 of the electronic device 101 and the dual antenna (e.g., the first antenna 430 and the second antenna 440) of the accessory apparatus 400. For example, as the degree of the overlap between the NFC antenna 182 of the electronic device 101 and the dual antenna (e.g., the first antenna 430 and the second antenna 440) of the accessory apparatus 400 increases, the amount of received data or received power of the dual antenna (e.g., the first antenna 430 and the second antenna 440) of the accessory apparatus 400 may increase, whereas the performance of the NFC antenna 182 of the electronic device 101 may be lowered. In addition, as the degree of the overlap between the NFC antenna 182 of the electronic device 101 and the dual antenna (e.g., the first antenna 430 and the second antenna 440) of the accessory apparatus 400 decreases, the amount of received data or received power of the dual antenna of the accessory apparatus 400 may be reduced, whereas the performance of the NFC antenna 182 of the electronic device 101 may not be significantly lowered.

According to an embodiment, in order to reduce the performance degradation of the NFC antenna 182 of the electronic device 101 while maintaining the amount of received data or received power of the accessory apparatus 400, the first antenna 430 may be designed to have the same resonance frequency band (e.g., 10 MHz to 14.99 MHz) as the NFC antenna 182 of the electronic device 101.

According to an embodiment, the second antenna 440 may be designed to have a specific frequency band (e.g., 15 MHz to 30 MHz) that does not duplicate the frequency band of the NFC antenna 182 in consideration of the resonance frequency shifting due to the coupling of the NFC antenna 182 and the second antenna 440 when the electronic device 101 and the accessory apparatus 400 are coupled. For example, the resonance frequency of the first antenna 430 may be configured to match the resonant frequency of the NFC antenna 182 of the electronic device 101, but the resonance frequency of the second antenna 440 may be configured to be totally different from the resonance frequency of the NFC antenna 182 of the electronic device 101.

Figure 8:
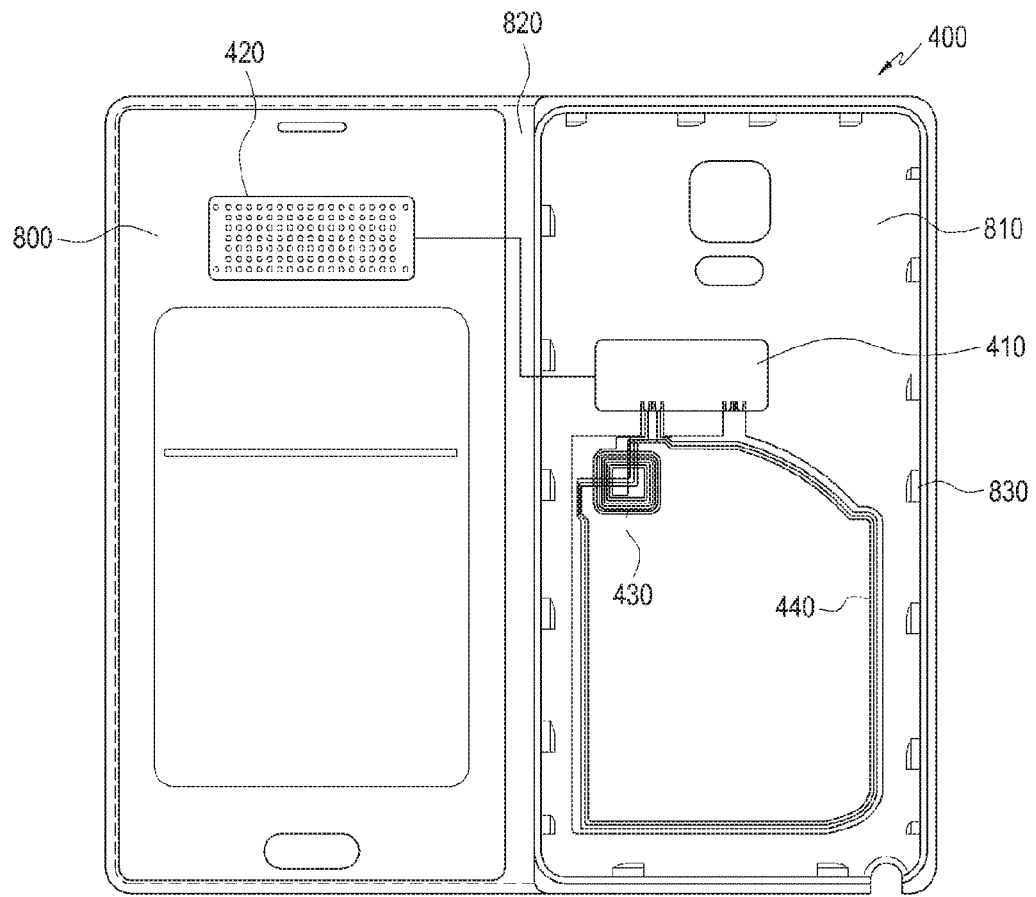
FIG. 8 is a plan view of an accessory apparatus, according to an embodiment of the present disclosure.

FIG. 8 is a plan view of an accessory apparatus, according to an embodiment of the present disclosure.

Referring to FIG. 8, the accessory apparatus 400 may include a housing, and the housing may include the first side 800 that is directed in the first direction, the second side 810 that is directed in the second direction that is the opposite direction of the first direction, and the third side 820 that surrounds some of the space between the first side 800 and the second side 810. According to various embodiments, the accessory apparatus 400 may be a protective cover of the electronic device 101. The protective cover may include a front cover portion (e.g., the first side 800) and a back cover portion (e.g., the second side 810).

According to an embodiment, the accessory apparatus 400 may include coupling members 830 that detachably couple the housing to the electronic device 101. One or more coupling members 830 may be formed on at least a part of the second side 810.

According to an embodiment, the first antenna 430 may be positioned inside the second side 810, which is the first conductive pattern that receives the data of the first RF signal from the electronic device 101. The second antenna 440 may be positioned inside the second side 810, which is the second conductive pattern that is electrically separated from the first antenna 430 and that receives the power of the first RF signal from the electronic device 101. In addition, the control module 410 may be positioned inside the second side 810, which is electrically connected with the first antenna 430 and the second antenna 440, receives the first RF signal and transmits the second RF signal through the first antenna 430, and transmits the power to the display element 420.

According to an embodiment, the display element 420 may be positioned in the first side 800, which is electrically connected with the control module 410, and which is driven by the control module 410.

According to an embodiment, the second detection member 402 for detecting the opening/closing of the first side 800 (e.g., the front cover portion) may be positioned in at least a portion of the first side 800. The electronic device 101 may detect the second detection member 402 through the sensor module 190. If the second detection member 402 is detected through the sensor module 190, the electronic device 101 may determine that the front cover portion is closed, and if the second detection member 402 is not detected through the sensor module 190, the electronic device 101 may determine that the front cover portion is open. For example, if the opening of the front cover portion is detected while transmitting the power to the accessory apparatus 400, the electronic device 101 may stop the supply of the power to the accessory apparatus 400.

Figure 9:
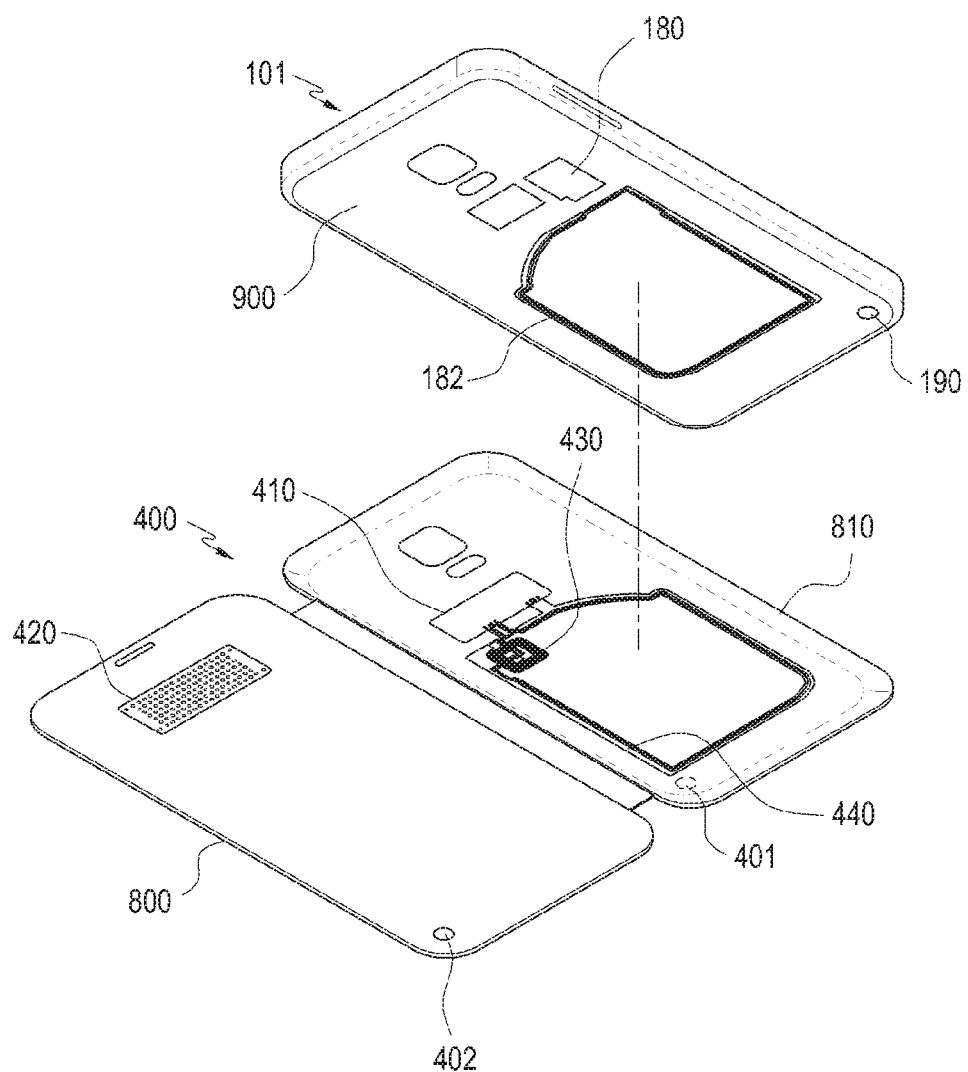
FIG. 9 is a perspective view of an example of an electronic device and an accessory apparatus, according to an embodiment of the present disclosure.

FIG. 9 is a perspective view of an example of an electronic device and an accessory apparatus, according to an embodiment of the present disclosure.

Referring to FIG. 9, the accessory apparatus 400 may include the first side 800 corresponding to the front cover portion and the second side 810 corresponding to the back cover portion. The first antenna 430, the second antenna 440, or the control module 410 may be disposed in some of the inner portion of the second side 810. The first detection member 401 may be further disposed in some of the inner portion of the second side 810. The display element 420 may be disposed in some of the first side 800.

The NFC module 180 and the NFC antenna 182 may be provided on the back side 900 of the electronic device 101. According to an embodiment, the NFC antenna 182 may be disposed at the position corresponding to the second antenna 440 of the accessory apparatus 400. The sensor module 190 may be further disposed on the back side 900.

The second side 810 of the accessory apparatus may have a structure to be connected, coupled, mounted, or fastened to the back side 900 of the electronic device 101. The electronic device 101 may be connected, coupled, mounted, or fastened to the second side 810 of the accessory apparatus.

When the electronic device 101 is connected, coupled, mounted, or fastened to the second side 810 of the accessory apparatus, the first detection member 401 of the accessory apparatus 400 may be detected by the sensor module 190 of the electronic device 101.

According to an embodiment, when the first detection member 401 of the accessory apparatus 400 is detected by the sensor module 190, the electronic device 101 may determine that the electronic device 101 has been coupled (or fastened) to the accessory apparatus. If it is determined that the electronic device 101 has been coupled (or fastened) to the accessory apparatus, the electronic device 101 may transmit a verification request signal to the accessory apparatus 400 through the NFC antenna 182. The accessory apparatus 400, which has received the verification request signal through the first antenna 430, may transmit a verification response signal to the electronic device 101 in response to the verification request signal. The electronic device 101, which has received the verification response signal, may perform the verification on the accessory apparatus 400.

According to an embodiment, when the verification on the accessory apparatus 400 is completed, the electronic device 101 may enter the standby state. When an event for activating the accessory apparatus 400 and displaying data occurs, the electronic device 101 may determine whether or not the second detection member 402 of the accessory apparatus 400 is detected by the sensor module 190. When the second detection member 402 is detected, the electronic device 101 may determine that the front cover portion of the accessory apparatus 400 is in the closed state, and may transmit, to the accessory apparatus 400, the first RF signal that contains the first power for activating the accessory apparatus 400 and the data to be displayed through the accessory apparatus 400.

Figure 10:
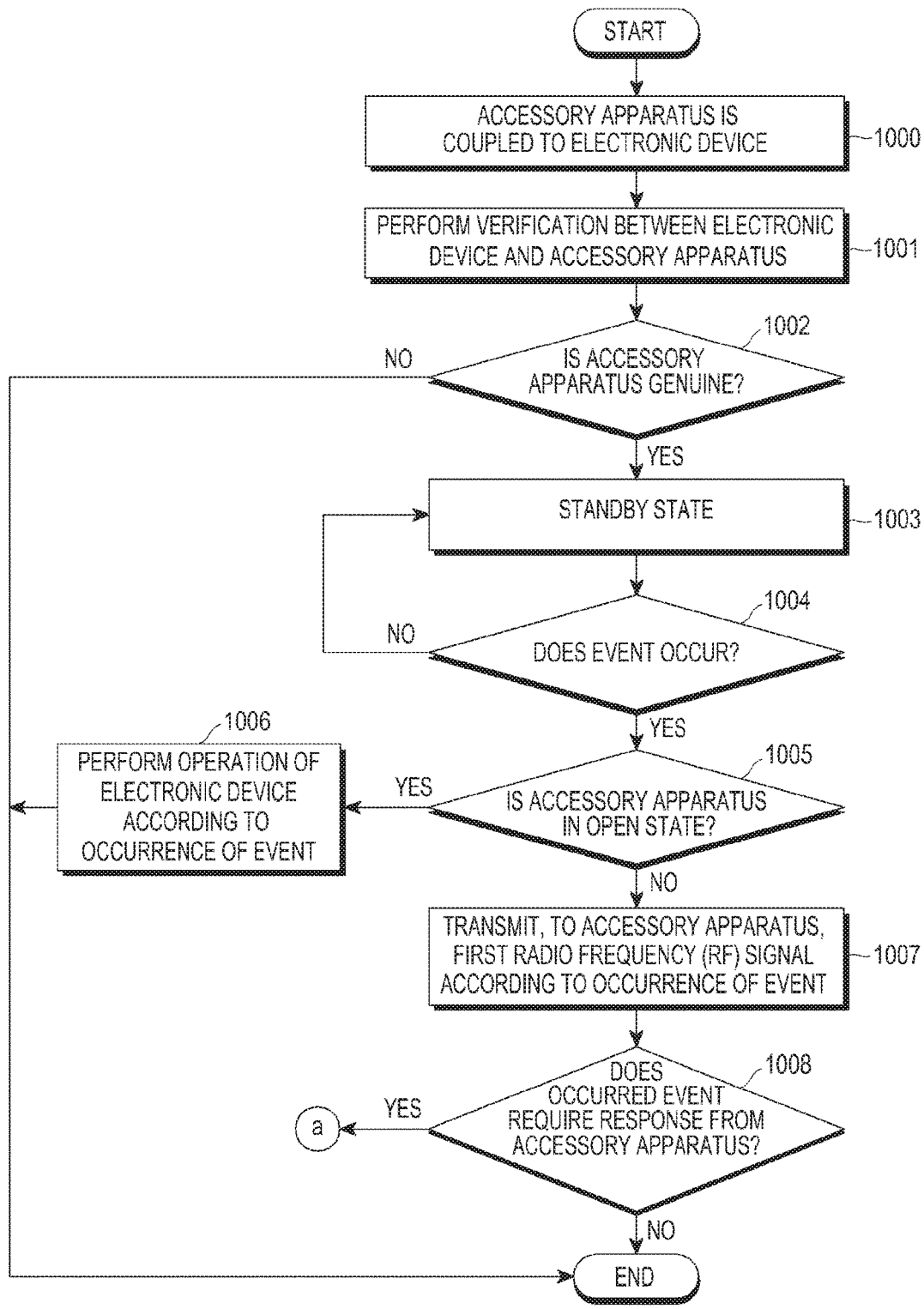
FIG. 10 is a flowchart illustrating an operation of transmitting data due to the occurrence of an event from an electronic device to an accessory apparatus, according to an embodiment of the present disclosure.

FIG. 10 is a flowchart illustrating an operation of transmitting data due to the occurrence of an event from an electronic device to an accessory apparatus, according to an embodiment of the present disclosure.

According to various embodiments, operation 1000 to operation 1008 may be performed through one of the electronic device 101 or 201, the server 106, the processor 120 or 210, the communication interface 170, the NFC module 180, or the program module 310.

Referring to FIG. 10, when the accessory apparatus 400 is coupled to the electronic device 101 in operation 1000, the electronic device 101 may perform verification between the electronic device 101 and the accessory apparatus 400 in operation 1001. For example, the electronic device 101 may transmit a verification request signal to the accessory apparatus 400, and when a verification response signal is received from the accessory apparatus 400, the electronic device 101 may perform the genuineness verification on the accessory apparatus 400.

The electronic device 101 may identify whether or not the accessory apparatus 400 is genuine in operation 1002, and if the accessory apparatus 400 is genuine, the electronic device 101 may perform operation 1003. Otherwise, the electronic device 101 may terminate the operation.

In operation 1003, the electronic device 101 may enter the standby state. According to an embodiment, the accessory apparatus 400 may be in the inactivated state in which the power is not supplied.

The electronic device 101 may determine whether or not an event for activating the accessory apparatus 400 occurs in operation 1004, and if the event has occurred, the electronic device 101 may perform operation 1005. Otherwise, the electronic device 101 may maintain the standby state in operation 1003.

The electronic device 101 may determine whether or not the accessory apparatus 400 is in the open state in operation 1005, and if the accessory apparatus 400 is in the open state, the electronic device 101 may perform the operation according to the occurrence of the event in 1006. Otherwise, the electronic device 101 may perform operation 1007.

In operation 1007, the electronic device 101 may transmit, to the accessory apparatus 400, the first RF signal due to the occurrence of the event.

Figure 11:
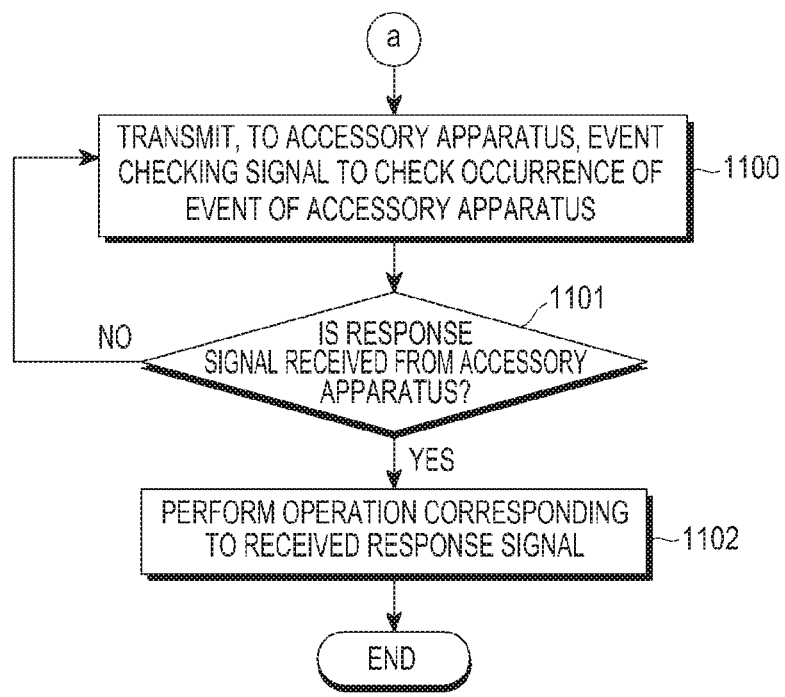
FIG. 11 is a flowchart illustrating an operation in which an electronic device receives a response of an accessory apparatus due to the occurrence of an event, according to an embodiment of the present disclosure.

The electronic device 101 may determine whether or not the occurred event requires a response from the accessory apparatus 400 in operation 1008, and if the event requires a response from the accessory apparatus 400, the electronic device 101 may perform operation 1100 of FIG. 11. Otherwise, the electronic device 101 may terminate the operation.

FIG. 11 is a flowchart illustrating an operation in which an electronic device receives a response of an accessory apparatus due to the occurrence of the event, according to an embodiment of the present disclosure.

According to various embodiments, operation 1100 to operation 1102 may be performed through one of the electronic device 101 or 201, the server 106, the processor 120 or 210, or the program module 310.

Referring to FIG. 11, in operation 1100, the electronic device 101 may transmit, to the accessory apparatus 400, an event checking signal to check the occurrence of the event of the accessory apparatus 400.

The electronic device 101 may determine whether or not the second RF signal, which is a response signal, is received from the accessory apparatus 400 in operation 1101, and if the second RF signal is received from the accessory apparatus 400, the electronic device 101 may perform operation 1102. Otherwise, the electronic device 101 may continue to transmit the event checking signal to the accessory apparatus 400 in operation 1100.

In operation 1102, the electronic device 101 may perform the operation corresponding to the received second RF signal. For example, if a call is received, the electronic device 101 may transmit the first RF signal related to the call reception to the accessory apparatus 400, and may periodically transmit the event checking signal to the accessory apparatus 400. When the second RF signal, which is a response signal to accept the call reception, is received from the accessory apparatus 400, the electronic device 101 may perform a call connection.

Figure 12:
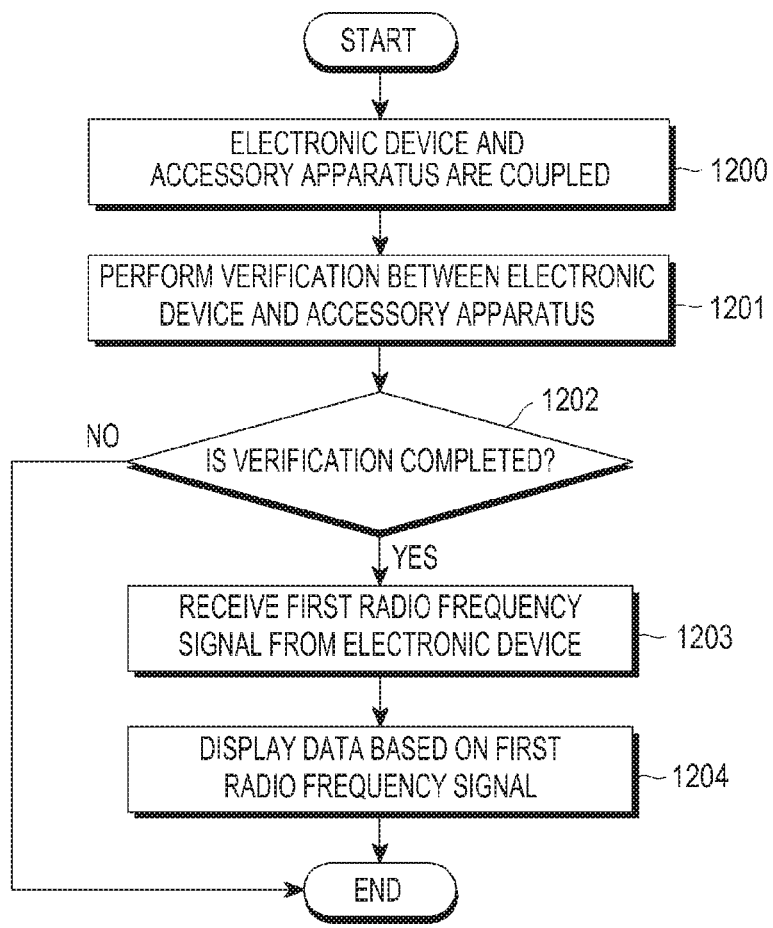
FIG. 12 is a flowchart illustrating an operation in which an accessory apparatus displays data received from an electronic device, according to an embodiment of the present disclosure.

FIG. 12 is a flowchart illustrating an operation in which an accessory apparatus displays data received from an electronic device, according to an embodiment of the present disclosure.

According to various embodiments, operation 1200 to operation 1204 may be performed through one of the electronic device 101 or 201, the server 106, the processor 120 or 210, the communication interface 170, the NFC module 180, the accessory apparatus 400, the control module 410, the wireless communication module 410-1, or the power management circuit 410-2.

Referring to FIG. 12, when the electronic device 101 and the accessory apparatus 400 are coupled in operation 1200, the accessory apparatus 400 may perform verification between the electronic device 101 and the accessory apparatus 400 in operation 1201.

According to an embodiment, when the electronic device 101 is coupled to the accessory apparatus 400, the accessory apparatus 400 may receive, from the electronic device 101, a verification request signal for the genuineness verification on the accessory apparatus 400 through the first antenna 430. For example, the sensor module 190 of the electronic device 101 may detect the magnetism, or the contact, of the first detection member 401 that is used to detect whether or not the electronic device 101 is coupled to the accessory apparatus 400. When the magnetism, or the contact, of the first detection member 401 is detected, the sensor module 190 may transmit the detection signal to the controller 120 of the electronic device 101. The controller 120 may transmit, to the accessory apparatus 400, the verification request signal that contains the second power to be used to perform the verification on the accessory apparatus 400 through the NFC antenna 182.

The accessory apparatus 400 may transmit, to the electronic device 101, a verification response signal through the first antenna 430 in response to the verification request signal. The electronic device 101, which has received the verification response signal from the accessory apparatus 400, may perform the verification on the accessory apparatus 400.

The accessory apparatus 400 may determine whether or not the verification is completed in operation 1202, and if the verification is completed, the accessory apparatus 400 may perform operation 1203. Otherwise, the accessory apparatus 400 may terminate the operation.

In operation 1203, the accessory apparatus 400 may receive the first RF signal from the electronic device 101.

According to an embodiment, the accessory apparatus 400 may receive the data of the first RF signal through the first antenna 430, and may receive the first power of the first RF signal through the second antenna.

For example, when an event for displaying data through the display element 420 of the accessory apparatus 400 occurs, the electronic device 101 may transmit, to the accessory apparatus 400, the first RF signal that contains the first power to be used to display data and the data to be displayed through the NFC antenna 182.

In operation 1204, the accessory apparatus 400 may display the data based on the first RF signal received.

According to an embodiment, the first processor 411 of the accessory apparatus 400 may control the switches 414 to transfer the first power received through the second antenna 440 to the display element 420. When the display element 420 is activated, the first processor 411 of the accessory apparatus 400 may transmit, to the activated display element 420, the data received through the first antenna 430 in order to display the data. For example, the second processor 421 may control the light-emitting element 425 to display the data transmitted from the first processor 411.

According to various embodiments, the method for operating the electronic device in a state, in which the accessory apparatus and an external electronic device are coupled to each other, may include in the accessory apparatus, receiving the first RF signal from the external electronic device, determining whether or not a display element of the accessory apparatus is to be operated based on the data that is contained in the first RF signal, based on at least some of the determination, operating the display element by using the power that is contained in the first RF signal received, and displaying the data by using the data that is contained in the first RF signal.

According to various embodiments, the first RF signal may have a different frequency band from the frequency band of the second conductive pattern.

According to various embodiments, the operation of receiving the first RF signal from the external electronic device may include using an NFC protocol.

According to various embodiments, the method may further include coupling the external electronic device to the accessory apparatus, and after the coupling, performing verification between the external electronic device and the accessory apparatus.

According to various embodiments, the operation of receiving the first RF signal from the external electronic device may include periodically receiving an event checking signal to check the occurrence of an event in the accessory apparatus.

According to various embodiments, the method may further include transmitting a response signal to the wireless communication circuit in response to the event checking signal.

Figure 13:
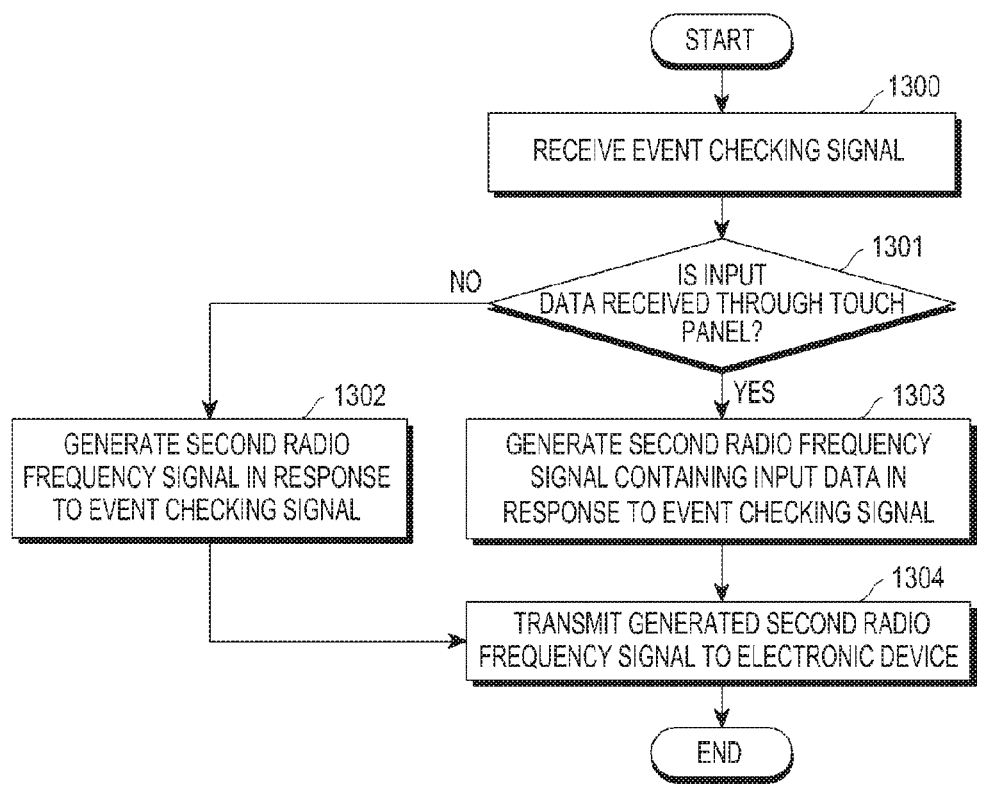
FIG. 13 is a flowchart illustrating an operation in which an accessory apparatus transmits data due to the occurrence of an event to an electronic device, according to an embodiment of the present disclosure.

FIG. 13 is a flowchart illustrating an operation in which an accessory apparatus transmits data due to the occurrence of an event to an electronic device, according to an embodiment of the present disclosure.

According to various embodiments, operation 1300 to operation 1304 may be performed through one of the electronic device 101 or 201, the server 106, the processor 120 or 210, the communication interface 170, the NFC module 180, the accessory apparatus 400, the control module 410, the wireless communication module 410-1, or the power management circuit 410-2.

Referring to FIG. 13, the accessory apparatus 400 may receive an event checking signal from the electronic device 101 in operation 1300. According to an embodiment, the accessory apparatus 400 may receive the event checking signal to check whether or not input data is received through the touch panel 424 while displaying the data received from the electronic device 101.

The accessory apparatus 400 may determine whether or not the input data is received through the touch panel 424 in operation 1301, and if the input data is received, the accessory apparatus 400 may perform operation 1303. Otherwise, the accessory apparatus 400 may perform operation 1302.

In operation 1302, the accessory apparatus 400 may generate the second RF signal in response to the event checking signal. For example, the accessory apparatus 400 may generate an event response signal that contains the data indicating that the input data has not been received through the touch panel 424.

In operation 1303, the accessory apparatus 400 may generate the second RF signal that contains the input data in response to the event checking signal. For example, if the data to inform of the call reception is received from the electronic device 101, the accessory apparatus 400 may display the data through the light-emitting element 425, and if the input data to accept the call reception is received through the touch panel 424, the accessory apparatus 400 may generate the second RF signal that is a response signal containing the input data for accepting the call reception. For example, if the input data for rejecting the call reception is received through the touch panel 424, the accessory apparatus 400 may generate a response signal that contains the input data to reject the call reception.

In operation 1304, the accessory apparatus 400 may transmit the generated second RF signal to the electronic device 101.

Figure 14:
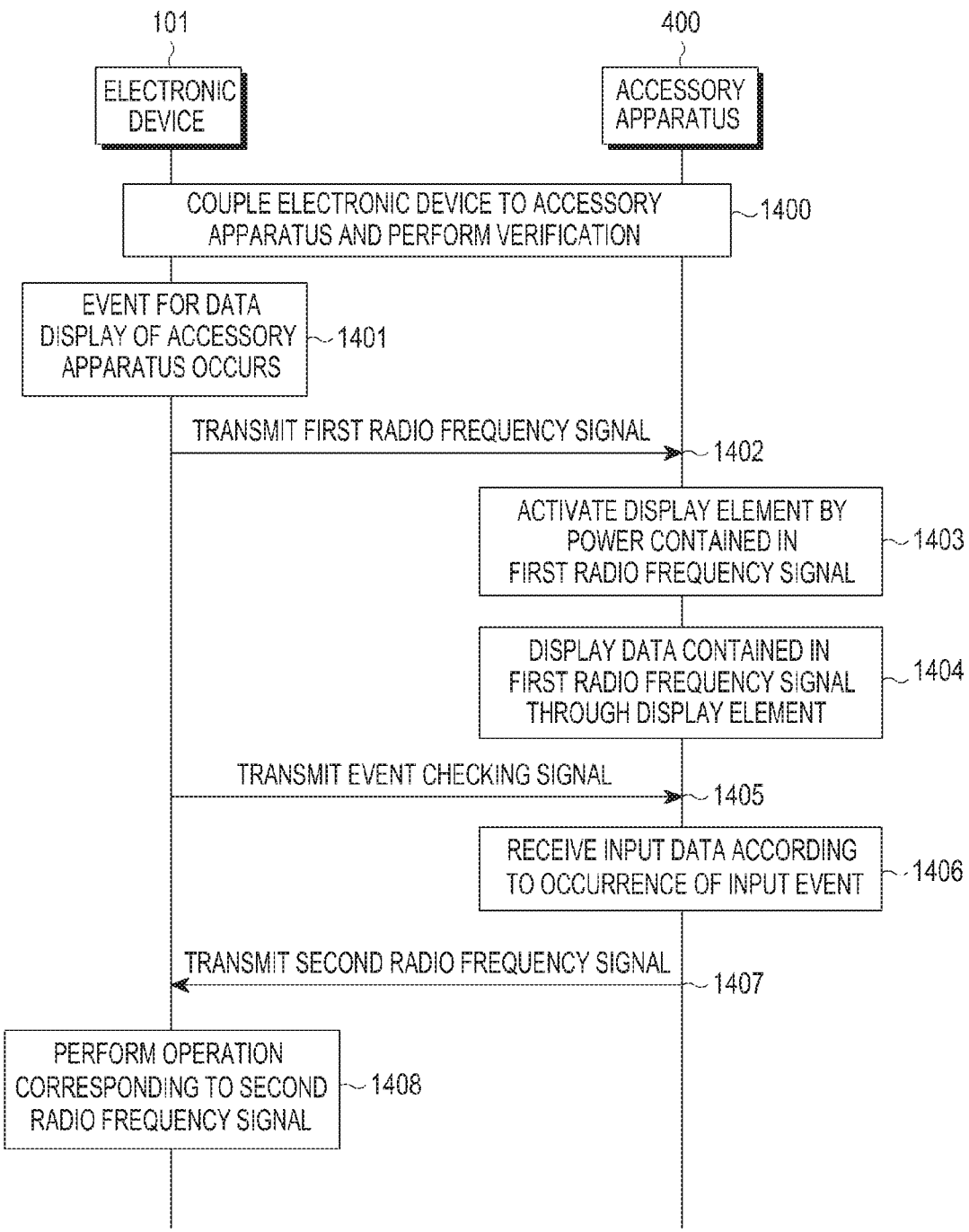
FIG. 14 is a flowchart illustrating transmission and reception of data between an electronic device and an accessory apparatus, according to an embodiment of the present disclosure.

FIG. 14 is a flowchart illustrating data transmission and reception between an electronic device and an accessory apparatus, according to an embodiment of the present disclosure.

According to various embodiments, operation 1400 to operation 1408 may be performed through one of the electronic device 101 or 201, the server 106, the processor 120 or 210, the communication interface 170, the NFC module 180, the accessory apparatus 400, the control module 410, the wireless communication module 410-1, or the power management circuit 410-2.

Referring to FIG. 14, the electronic device 101 and the accessory apparatus 400 may perform the coupling and verification in operation 1400. According to an embodiment, when the electronic device 101 is coupled to the accessory apparatus 400, the electronic device 101 may transmit a verification request signal to the accessory apparatus 400. In addition, when a verification response signal is received from the accessory apparatus 400 in response to the verification request signal, the electronic device 101 may perform the verification between the electronic device 101 and the accessory apparatus 400.

If an event for the data display of the accessory apparatus 400 occurs in operation 1401, the electronic device 101 may transmit the first RF signal to the accessory apparatus 400 in operation 1402. According to an embodiment, when an event (e.g., the call reception, the message reception, an alarm, a timer, the battery level, playing music, notification, or volume control) for activating the accessory apparatus 400 and displaying data occurs, the electronic device 101 may generate the first RF signal that contains the first power for activating the accessory apparatus 400 and data (e.g., text, numbers, or icons to indicate the call reception, the message reception, an alarm, a timer, the battery level, playing music, notification, or volume control) that is related to the occurred event. The electronic device 101 may transmit the first RF signal generated to the accessory apparatus 400 through the NFC antenna 182 shown in FIG. 5.

In operation 1403, the accessory apparatus 400 may be activated by the power contained in the first RF signal. According to an embodiment, the accessory apparatus 400 may receive the first power of the first RF signal through the second antenna 440, and may activate the control module 410 and display element 420 by the first power received. The wireless communication circuit 410-1 may control the power management circuit 410-2 to transfer the first power to the display element 420.

In operation 1404, the accessory apparatus 400 may display the data contained in the first RF signal through the display element 420. According to an embodiment, when the display element 420 is activated, the wireless communication circuit 410-1 may transmit, to the display element 420, the data of the first RF signal received through the first antenna 430. The display element 420 may display the received data.

In operation 1405, the electronic device 101 may transmit, to the accessory apparatus 400, an event checking signal to check whether or not an event for the data display occurs. According to an embodiment, the electronic device 101 may periodically transmit, to the accessory apparatus 400, a polling signal to check whether or not input data is received through the touch panel 424 of the accessory apparatus 400.

When the input data due to the occurrence of the input event is received in operation 1406, the accessory apparatus 400 may transmit the second RF signal to the electronic device 101 in response to the event checking signal in operation 1407. According to an embodiment, when the input data is received through the touch panel 424 while displaying the data through the light-emitting element 425, the accessory apparatus 400 may generate an event response signal that contains the received input data. The input data may be input through a key input, a touch input, a dragging input, a hovering input, a swipe input, or a combination thereof by using input means {e.g., a body (e.g., fingers), a stylus, one or more keys, or the like}. For example, the input data may represent the acceptance or rejection of the event occurred in the electronic device 101.

In operation 1408, the electronic device 101 may perform the operation corresponding to the second RF signal. For example, when a call is received, the electronic device 101 may transmit the data representing the call reception to the accessory apparatus 400, and when the data for accepting the call reception is received from the accessory apparatus 400, the electronic device 101 may perform a call connection.

Figure 15:
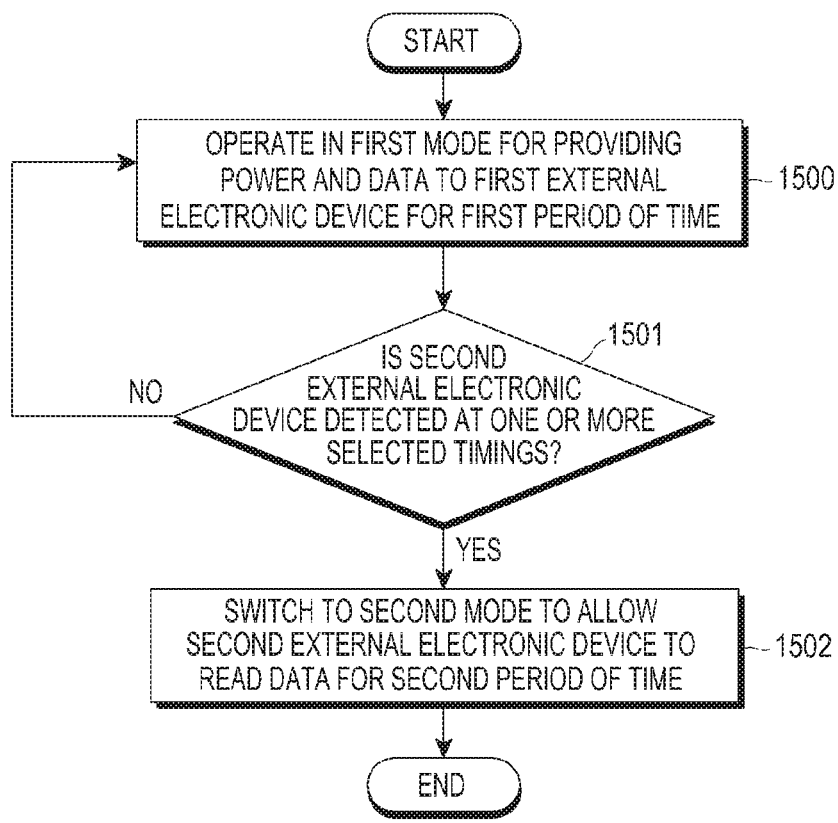
FIG. 15 is a flowchart illustrating an operation in which an electronic device detects an external electronic device, according to an embodiment of the present disclosure.

FIG. 15 is a flowchart illustrating an operation in which an electronic device detects an external electronic device, according to an embodiment of the present disclosure.

According to various embodiments, operation 1500 to operation 1502 may be performed through one of the electronic device 101 or 201, the server 106, the processor 120 or 210, the communication interface 170, the NFC module 180, or the program module 310.

Referring to FIG. 15, in operation 1500, the electronic device 101 (e.g., the NFC module 180) may operate in the first mode (e.g., the accessory mode) in which data is provided to the first external electronic device (e.g., the accessory apparatus 400) for the first period of time. According to an embodiment, the electronic device 101 may control the NFC module 180 to operate in the accessory mode for the first period of time according to the occurrence of an event, and the NFC module 180 may transmit, to the accessory apparatus 400, the first power for the data display and the data.

In operation 1501, the electronic device 101 (e.g., the NFC module 180) may determine whether or not the second external electronic device (e.g., the NFC reader) is detected at one or more selected timings, and if the second external electronic device (e.g., the NFC reader) is detected, the electronic device 101 (e.g., the NFC module 180) may perform operation 1502. If the second external electronic device (e.g., the NFC reader) is not detected, the electronic device 101 (e.g., the NFC module 180) may operate in the first mode for the first period of time in operation 1500.

According to an embodiment, the processor 120 may transmit, to the NFC module 180, a command to detect the presence of the second external electronic device (e.g., the NFC reader) at one or more selected timings for the first period of time. The NFC module 180, which has received the command, may transmit, to the accessory apparatus 400, a request signal to request the detection of the second external electronic device (e.g., the NFC reader) through the NFC antenna 182. If a response signal is not received from the accessory apparatus 400 within a predetermined time, or if a response signal containing error data is received, the NFC module 180 may transmit, to the processor 120, a response indicating that the second external electronic device (e.g., the NFC reader) has been detected. When the response signal indicating that the second external electronic device (e.g., the NFC reader) has not been detected is received from the accessory apparatus 400, the NFC module 180 may transfer, to the processor 120, the response indicating that the second external electronic device (e.g., the NFC reader) has not been detected.

According to an embodiment, the processor 120 may control the NFC module 180 to stop the transmission of the first RF signal at one or more selected timings for the first period of time. The NFC module 180 may determine whether or not the second external electronic device (e.g., the NFC reader) is detected while the transmission of the first RF signal is stopped. For example, when an external RF signal is detected, the NFC module 180 may determine that the second external electronic device (e.g., the NFC reader) has been detected, and when the external RF signal is not detected, the NFC module 180 may determine that the second external electronic device (e.g., the NFC reader) has not been detected.

According to an embodiment, when the second external electronic device (e.g., the NFC reader) is detected, the NFC module 180 may transmit, to the processor 120, a response indicating that the second external electronic device (e.g., the NFC reader) has been detected.

In operation 1502, the electronic device 101 (e.g., the NFC module 180) may switch to the second mode (e.g., the card emulation mode) in which the second external electronic device (e.g., the NFC reader) is allowed to read data for the second period of time.

According to an embodiment, when the response indicating that the second external electronic device (e.g., the NFC reader) has been detected is received from the NFC module 180, the processor 120 may control the NFC module 180 to operate in the card emulation mode for the second period of time. The NFC module 180 may switch to the card emulation mode in order to thereby allow the second external electronic device (e.g., the NFC reader) to read the data, and when the operation with the second external electronic device (e.g., the NFC reader) is completed, the NFC module 180 may switch to the first mode (e.g., the accessory mode) or other modes (e.g., the card emulation mode, the search mode, or the reader mode) under the control of the processor 120.

According to various embodiments, the method for operating an electronic device, which includes a housing, a display that is exposed through the first portion of the housing, a conductive pattern that is positioned in the housing or forms a portion of the housing, and a wireless communication circuit that is electrically connected with the conductive pattern, may include by the electronic device, operating in the first mode that is configured to provide the first data to the first type of external electronic device for the first period of time, by the electronic device, operating in the second mode in which the second type of external electronic device is allowed to read the second data for the second period of time following the first period of time, by the electronic device, detecting the second type of external electronic device at one or more selected timings during the first period of time, and when the second type of external electronic device is detected, operating in the second mode.

According to various embodiments, the second data may contain payment-related information.

According to various embodiments, the wireless communication circuit may support an NFC protocol. The first mode may be a reader mode of the NFC protocol, and the second mode may be a card mode of the NFC protocol.

According to various embodiments, the operation of detecting the second type of external electronic device may include detecting the second type of external electronic device by using an impulse signal.

According to various embodiments, the operation of detecting the second type of external electronic device may include switching to the third mode for detecting the second type of external electronic device in order to thereby detect the same.

According to various embodiments, the first type of external electronic device may include an accessory apparatus that is able to be coupled to the electronic device.

According to various embodiments, the method may further include transmitting a verification request signal to the accessory apparatus when the accessory apparatus is coupled, and when a verification response signal is received from the accessory apparatus, performing the verification with the accessory apparatus.

According to various embodiments, the method may further include, when an event with respect to the electronic device occurs, operating in the first mode in order to thereby transmit, to the accessory apparatus, the first RF signal that contains the power and data related to the event.

According to various embodiments, the method may further include when an event with respect to the electronic device occurs, determining whether the accessory apparatus is in the open state or in the closed state, and if the accessory apparatus is in the closed state, transmitting the first signal of the first RF signal to the accessory apparatus.

According to various embodiments, the method may further include, if the occurred event requires a response of the accessory apparatus, transmitting, to the accessory apparatus, an event checking signal to check the occurrence of the event with respect to the accessory apparatus.

According to various embodiments, the method may further include receiving an event response signal from the accessory apparatus in response to the event checking signal, and corresponding to the received event response signal.

Figure 16:
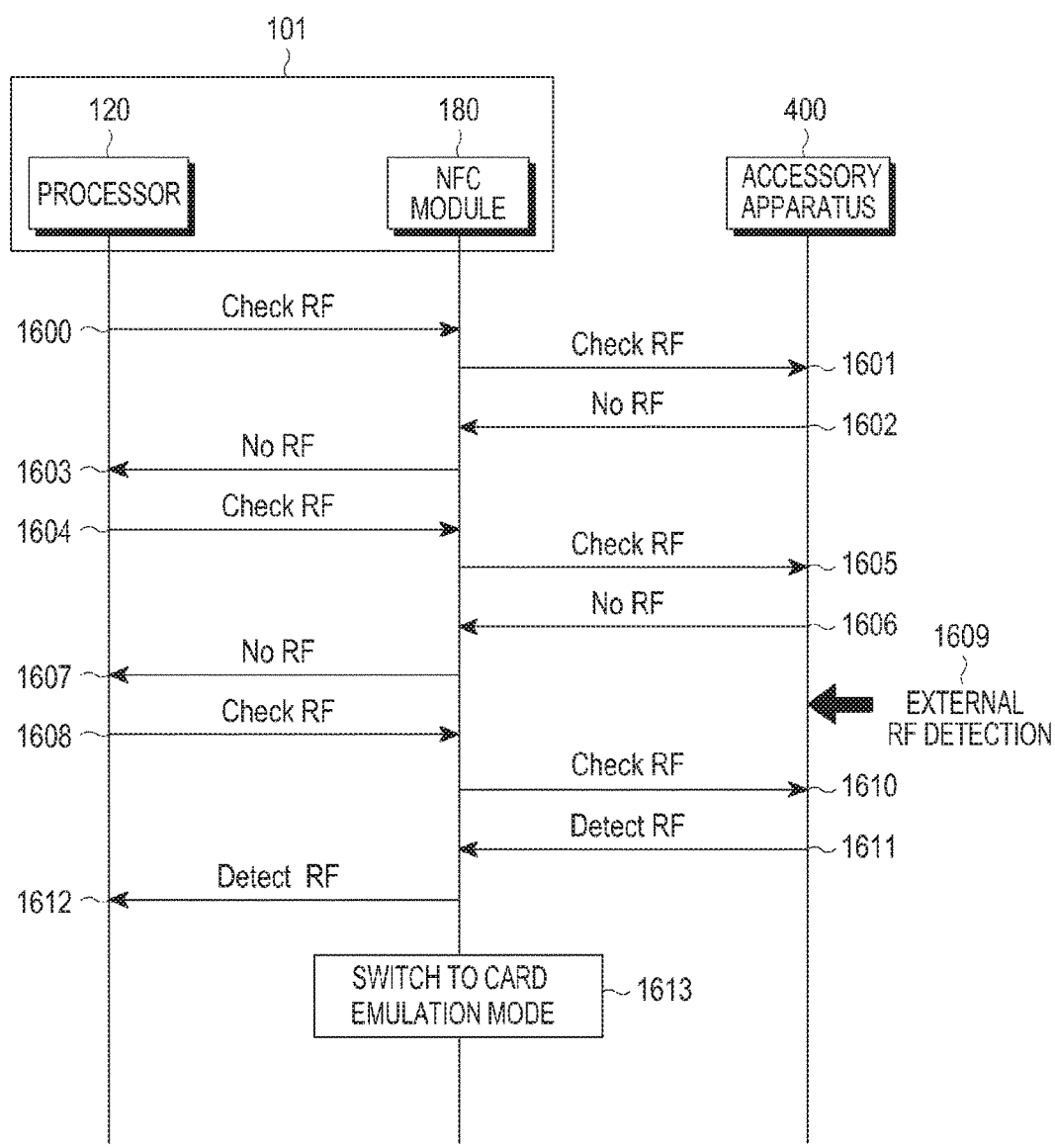
FIG. 16 is a flowchart illustrating an operation in which an electronic device detects an external electronic device, according to an embodiment of the present disclosure.

FIG. 16 is a flowchart illustrating an operation in which an electronic device detects an external electronic device, according to an embodiment of the present disclosure.

According to various embodiments, operation 1600 to operation 1613 may be performed through one of the electronic device 101 or 201, the server 106, the processor 120 or 210, the communication interface 170, the NFC module 180, or the program module 310.

Referring to FIG. 16, the processor 120 of the electronic device 101 may control the NFC module 180 of the electronic device 101 to operate in the first mode (e.g., the accessory mode) for the first period of time according to the occurrence of the event.

In operation 1600, the processor 120 may transmit, to the NFC module 180, a command (check RF) to detect an external electronic device. According to an embodiment, the processor 120 may transmit, to the NFC module 180, the command at one or more selected timings during the first period of time.

In operation 1601, the NFC module 180 may transmit, to the accessory apparatus 400, a request signal (check RF) to determine whether or not the external electronic device is detected through the NFC antenna 182.

In operation 1602, if the external electronic device is not detected, the accessory apparatus 400 may transmit, to the NFC module 180, a response signal indicating that the external electronic device has not been detected.

In operation 1603, the NFC module 180 may transfer, to the processor 120, the response indicating that the external electronic device has not been detected.

Operation 1604 to operation 1607 may be performed in a similar manner as operation 1600 to operation 1603 described above.

In operation 1608, the processor 120 may transmit, to the NFC module 180, a command (check RF) to detect the external electronic device.

If an external RF field is detected in operation 1609, the accessory apparatus 400 may receive, from the NFC module 180, a request signal (check RF) to determine whether or not the external electronic device is detected in operation 1610.

In operation 1611, the accessory apparatus 400 may transmit, to the NFC module 180, a response signal (detect RF) indicating that the external electronic device has been detected.

In operation 1612, the NFC module 180 may transmit, to the processor 120, the response signal indicating that the external electronic device has been detected.

In operation 1613, the NFC module 180 may switch to the card emulation mode, under the control of the processor 120, in order to thereby allow the external electronic device to read the data of the NFC module 180. According to an embodiment, when the external electronic device is detected, the processor 120 may control the NFC module 180 to operate in the card emulation mode for the second period of time.

Figure 17:
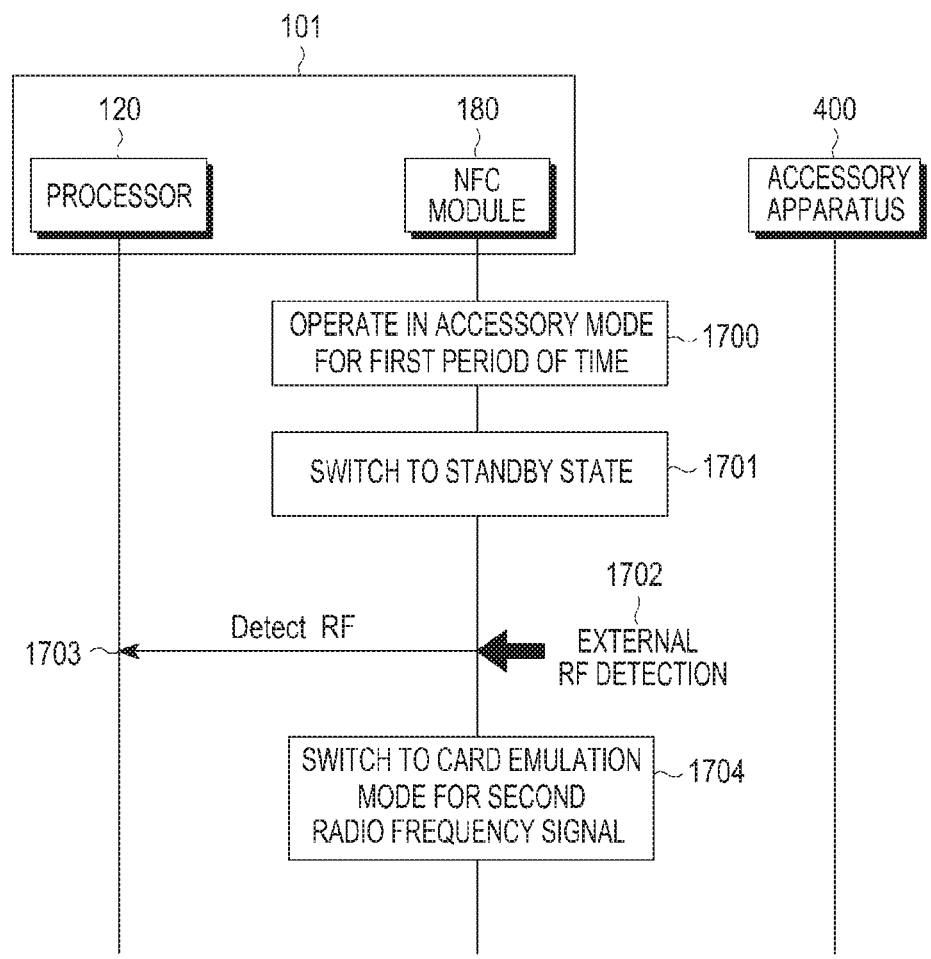
FIG. 17 is a flowchart illustrating an operation in which an electronic device detects an external electronic device, according to an embodiment of the present disclosure.

FIG. 17 is a flowchart illustrating an operation in which an electronic device detects an external electronic device, according to an embodiment of the present disclosure.

According to various embodiments, operation 1700 to operation 1703 may be performed through one of the electronic device 101 or 201, the server 106, the processor 120 or 210, the communication interface 170, the NFC module 180, or the program module 310.

Referring to FIG. 17, in operation 1700, the NFC module 180 may operate in the accessory mode for the first period of time under the control of the processor 120. According to an embodiment, the processor 120 may control the NFC module 180 to operate in the accessory mode for the first period of time according to the occurrence of the event.

In operation 1701, the NFC module 180 may switch to the standby state {e.g., the state in which the transmission of the first RF signal is stopped in the first mode} under the control of the processor 120. According to an embodiment, the processor 120 may control the NFC module 180 to operate in the standby state {e.g., the state in which the transmission of the first RF signal is stopped in the first mode} at one or more selected timings during the first period of time. The NFC module 180 may stop the transmission of the power and data to the accessory apparatus 400 in the standby state, and may detect an external RF signal. The accessory apparatus 400 may be deactivated while the NFC module 180 operates in the standby state {e.g., the state in which the transmission of the first RF signal is stopped in the first mode} in order to thereby minimize the influence of the first antenna 430 and/or the second antenna 440 of the accessory apparatus 400.

In operation 1702, if the external RF signal is detected, the NFC module 180 may transmit, to the processor 120, a signal indicating that the external electronic device has been detected in operation 1703.

In operation 1704, the NFC module 180 may operate in the card emulation mode for the second period of time under the control of the processor 120. According to an embodiment, when the signal indicating that the external electronic device has been detected is received from the NFC module 180, the processor 120 may control the NFC module 180 to operate in the card emulation mode for the second period of time.

Figure 18C:
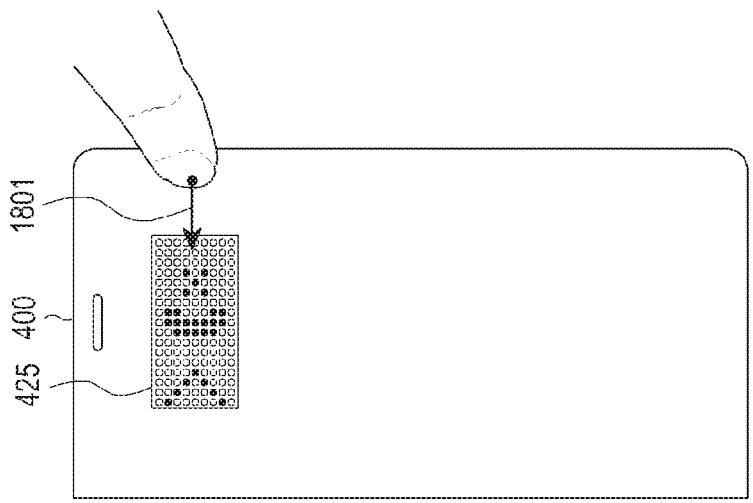
FIGS. 18A through 18C are views to explain an operation in which an accessory apparatus displays data that is related to a reception of a call of an electronic device, according to various embodiments of the present disclosure.
Figure 18B:
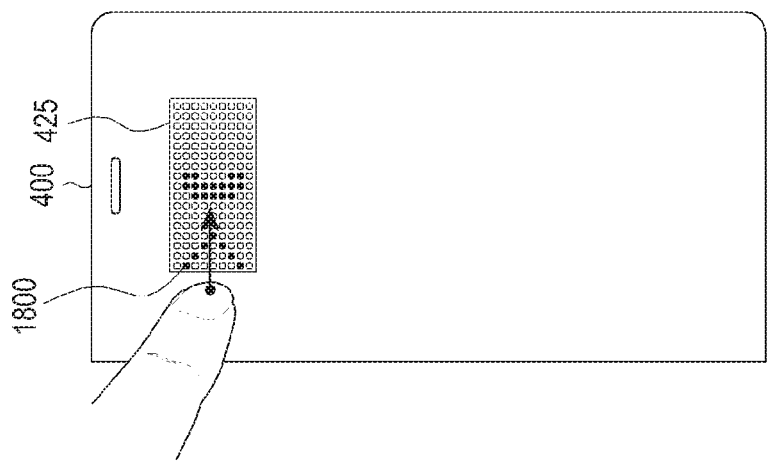
Figure 18A:
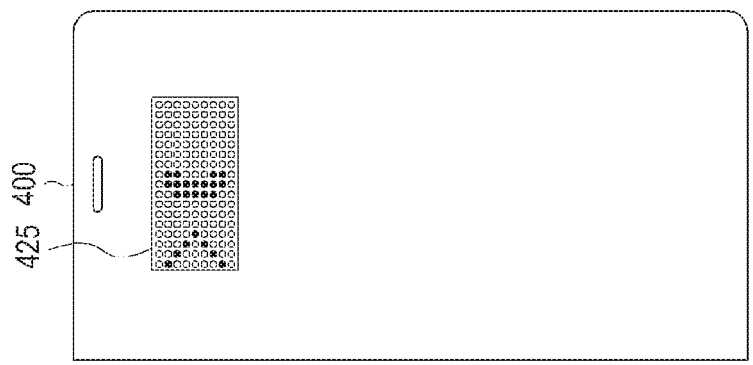

FIGS. 18A through 18C are views to explain an operation in which an accessory apparatus displays data that is related to reception of a call of an electronic device, according to various embodiments of the present disclosure.

Referring to FIG. 18A through 18C, when the first RF signal containing the data related to the call reception is received from the electronic device 101, the accessory apparatus 400 may display information on the call reception through the light-emitting element 425 by using the data contained in the first RF signal received.

According to an embodiment, the accessory apparatus 400 may store configuration values that are related to various events of the electronic device 101 or the display data related to the configuration values. For example, the configuration value may be the first value (e.g., 00) in the case of the call reception, the second value (e.g., 01) in the case of an alarm, the third value (e.g., 10) in the case of a timer, and the fourth value (e.g., 11) in the case of the message reception. In addition, the display data related to the configuration value may contain text, numbers, icons, emoticons, or images corresponding to the first value, the second value, the third value, and the fourth value, respectively.

When the first RF signal containing the configuration value (e.g., 00) related to the occurred event (e.g., the call reception) is received from the electronic device, the accessory apparatus 400 may display information on the call reception through the light-emitting element 425, as shown in FIG. 18A, by using the display data (e.g., a call image) corresponding to the configuration value.

When a swipe input 1800 for accepting the call reception is received through the touch panel 424 while the polling signal is periodically received from the electronic device 101 as shown in FIG. 18B, the accessory apparatus 400 may transmit, to the electronic device 101, a response signal {the second RF signal} to accept the call reception.

When a swipe input 1801 for rejecting the call reception is received through the touch panel 424 while the polling signal is periodically received from the electronic device 101 as shown in FIG. 18C, the accessory apparatus 400 may transmit, to the electronic device 101, a response signal {the second RF signal} to reject the call reception.

Accordingly, the electronic device 101 may perform the operation (e.g., the acceptance or rejection of the call reception) corresponding to the received response signal.

Figures 19A, 19B:
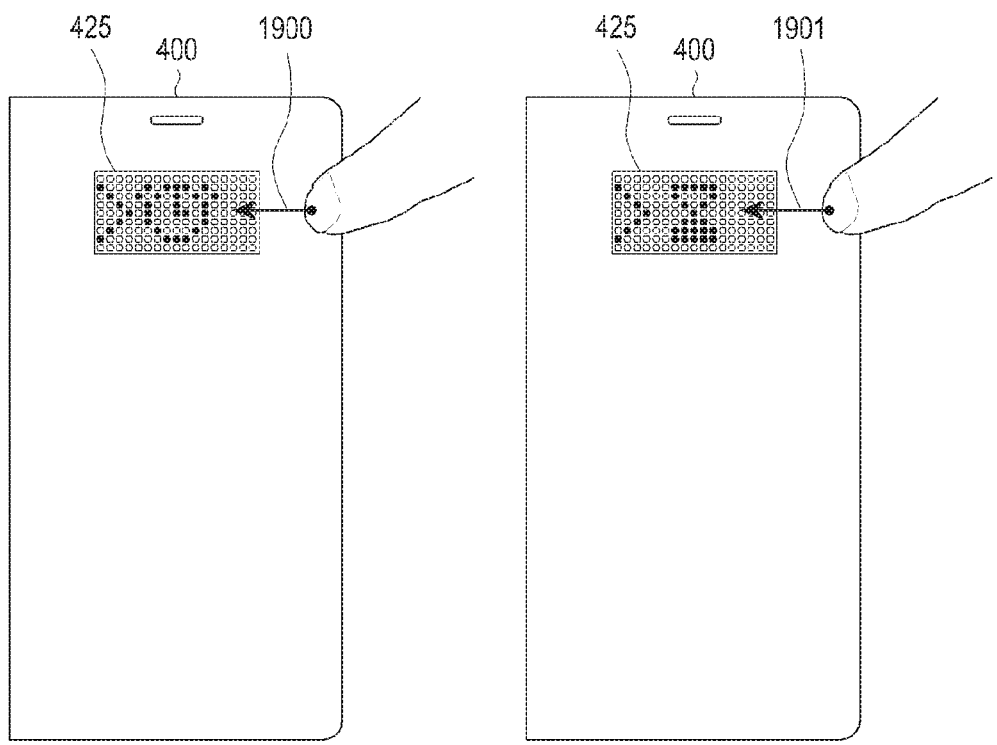
FIGS. 19A and 19B are views to explain an operation in which an accessory apparatus displays data that is related to various events of an electronic device, according to an embodiment of the present disclosure.

FIGS. 19A and 19B are views to explain an operation in which an accessory apparatus displays data that is related to various events of an electronic device, according to various embodiments of the present disclosure.

Referring to FIGS. 19A and 19B, when the data related to an alarm event is received from the electronic device 101, the accessory apparatus 400 may display an alarm image (or icon) through the light-emitting element 425 by using the received data.

When a swipe input 1900 to check the alarm is received while the polling signal is periodically received from the electronic device 101 as shown in FIG. 19A, the accessory apparatus 400 may transmit, to the electronic device 101, a response signal {the second RF signal} to check the alarm. According to this, the electronic device 101 may perform the operation (e.g., checking the alarm) corresponding to the received response signal.

When a swipe input 1901 to check that the message is received while the polling signal is periodically received from the electronic device 101 as shown in FIG. 19B, the accessory apparatus 400 may transmit, to the electronic device 101, a response signal {the second RF signal} to check the message. According to this, the electronic device 101 may perform the operation (e.g., checking the messages) corresponding to the received response signal. For example, the electronic device 101 may display the content of the message on the screen.

Figure 20:
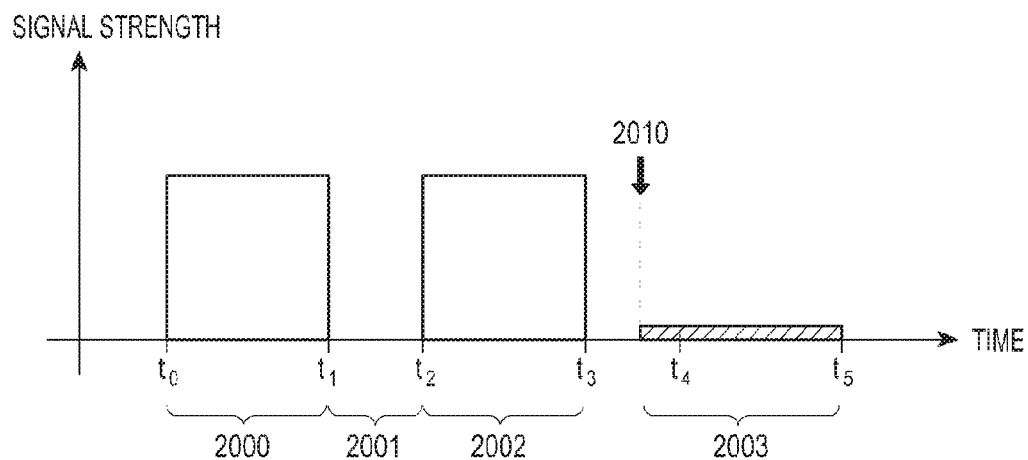
FIG. 20 is a view to illustrate an operation in which an electronic device detects an external electronic device, according to an embodiment of the present disclosure.

FIG. 20 is a view to illustrate an operation in which an electronic device detects an external electronic device, according to an embodiment of the present disclosure.

Referring to FIG. 20, if an event for transmitting the power and/or data to the accessory apparatus 400 occurs, the processor 120 may control the NFC module 180 to operate in the first mode (e.g., the accessory mode) for the first period of time (e.g., between the time to and the time $t_1$) (2000). The NFC module 180 may transmit, to the accessory apparatus 400, the power for driving the accessory apparatus 400 for the first period of time and the data to be displayed.

According to an embodiment, the processor 120 may control the NFC module 180 to operate in the standby state {e.g., the state in which the transmission of the first RF signal is stopped in the first mode} at the selected timing (e.g., the time $t_1$). The NFC module 180 may operate in the standby state {e.g., the state in which the transmission of the first RF signal is stopped in the first mode} from the time $t_1$ to the time $t_2$ (2001) in order to thereby determine whether or not an external RF signal is detected. If the external RF signal is not detected, the processor 120 may control the NFC module 180 to switch to the first mode (e.g., the accessory mode) from the time $t_2$ to the time $t_3$ (2002).

The processor 120 may control the NFC module 180 to operate in the standby state {e.g., the state in which the transmission of the first RF signal is stopped in the first mode} at the selected timing (e.g., the time $t_3$). If an external RF signal is detected at a specific timing 2010 while the NFC module 180 operates in the standby state, the NFC module 180 may transmit, to the processor 120, a signal indicating that the external electronic device has been detected. The processor 120 may control the NFC module 180 to operate in the second mode (e.g., the card emulation mode) for the second period of time (e.g., from the timing 2010 of detecting the external RF signal to the time $t_5$) (2003). The NFC module 180 may switch to the second mode for the second period of time in order to thereby allow the external electronic device to read data of the NFC module 180.

Figure 21:
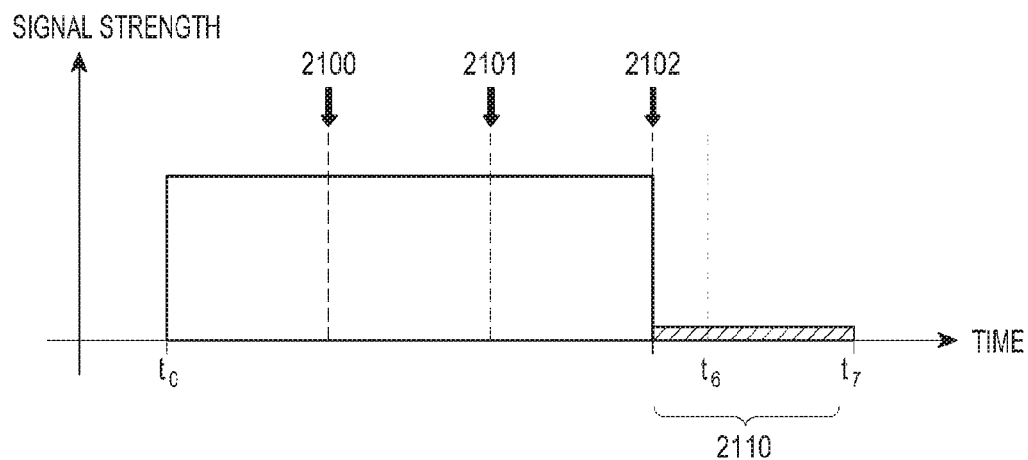
FIG. 21 is a view to illustrate an operation in which an electronic device detects an external electronic device, according to an embodiment of the present disclosure.

FIG. 21 is a view to illustrate an operation in which an electronic device detects an external electronic device, according to an embodiment of the present disclosure.

Referring to FIG. 21, when an event for transmitting the power and/or data to the accessory apparatus 400 occurs, the processor 120 may control the NFC module 180 to operate in the first mode (e.g., the accessory mode) for the first period of time (e.g., from the time to $t_0$ the time $t_6$). The NFC module 180 may transmit, to the accessory apparatus 400, the power for driving the accessory apparatus 400 for the first period of time and the data to be displayed.

According to an embodiment, the processor 120 may transmit, to the NFC module 180, a command to detect (e.g., to detect an external RF signal) an external electronic device (e.g., the RF reader) at the first timing 2100 and the second timing 2101, which are selected. The NFC module 180 may generate a detection signal to detect the external electronic device, and may transmit the same to the accessory apparatus 400 through the NFC antenna 182. The detection signal may be an impulse signal.

When a response signal is received from the accessory apparatus 400, the NFC module 180 may identify the received response signal, and if it is determined that the external electronic device has not been detected, the NFC module 180 may transmit, to the processor 120, a signal indicating that the external electronic device has not been detected.

According to an embodiment, the processor 120 may transmit, to the NFC module 180, a command to detect (e.g., to detect an external RF signal) an external electronic device (e.g., the RF reader) at the third timing 2102 selected. The NFC module 180 may generate a detection signal to detect the external electronic device, and may transmit the same to the accessory apparatus 400 through the NFC antenna 182. When a response signal is received from the accessory apparatus 400, the NFC module 180 may identify the received response signal, and if it is determined that the external electronic device has been detected, the NFC module 180 may transmit, to the processor 120, a signal indicating that the external electronic device has been detected. The processor 120 may control the NFC module 180 to operate in the second mode (e.g., the card emulation mode) for the second period of time (e.g., from the third timing 2102 of detecting the external electronic device to the time $t_7$) (2110). The NFC module 180 may switch to the second mode for the second period of time in order to thereby allow the external electronic device to read data of the NFC module 180.

Figure 22A:
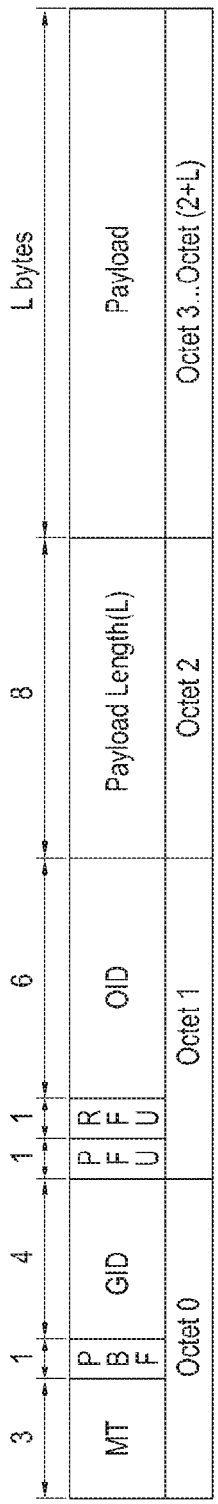

FIGS. 22A and 22B are various views illustrating a data packet that is transmitted between the processor and the NFC module, according to various embodiments of the present disclosure.

Referring to FIG. 22A, the data packet, which is exchanged between the processor 120 and the NFC module 180, may be configured as shown in diagram (a) of FIG. 22A. For example, the data packet may include a message type (MT) field, a packet boundary flag (PBF) field, a group identifier (GID) field, an operation code (opcode) identifier (OID) field, a packet header that contains a payload length (L) field, or a payload field.

According to an embodiment, the MT field may contain data indicating the type of data packet, such as a command message, a response message, or a notification message. The data may contain data (e.g., 001b) representing a command message or data (e.g., 010b) representing a response message as shown in diagram (b) of FIG. 22A. The PBF field may contain data indicating whether the data contains a complete message, contains the last segment of a segmented message, or does not contain the message. The global index file (GID) field may contain data that indicates the category of the message. The data may contain data (e.g., 1111b) that indicates an owner's (proprietary) message as shown in diagram (c) of FIG. 22A. The OID field may contain data that represents an identifier (ID) of the control message. The data may contain data (e.g., 11 1001b) that represents the RF field check as shown in diagram (d) of FIG. 22A. The L field may contain data that indicates the number of octets that exist in the payload field. The payload field may contain data that is used to detect the external electronic device.

According to an embodiment, a command that is transmitted from the processor 120 to the NFC module 180 in order to detect the external electronic device may contain the same data packet as diagram (a) of FIG. 22B.

Referring to FIG. 22B, a response, which is transmitted from the NFC module 180 to the processor in response to the command, may be configured with the data packet that shows that the external electronic device has not been detected as shown in diagram (b) of FIG. 22B, or may contain the data packet that shows that the external electronic device has been detected as shown in diagram (c) of FIG. 22B. The payload field of the data packet of diagram (b) in FIG. 22B may contain data indicating that the external electronic device has not been detected (RF not detected). In addition, the payload field of the data packet of diagram (c) in FIG. 22B may contain data indicating that the external electronic device has been detected (RF detected).

Figure 23:
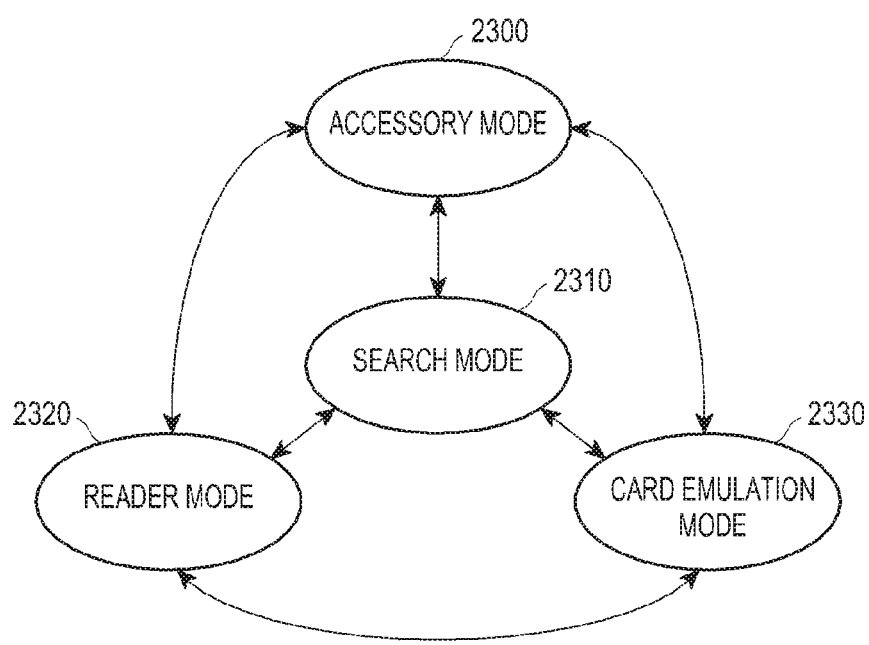
FIG. 23 is a view to explain an operation in which an operation mode of an NFC module is converted in an electronic device, according to an embodiment of the present disclosure.

FIG. 23 is a view to explain an operation in which an operation mode of an NFC module is converted in an electronic device, according to an embodiment of the present disclosure.

Referring to FIG. 23, the NFC module 180 may operate in at least one of a reader mode 2320, a search mode 2310, or a card emulation mode 2330. If the first external electronic device (e.g., the accessory apparatus 400) is coupled while the NFC module 180 operates in at least one of the reader mode 2320, the search mode 2310, or the card emulation mode 2330, the verification operation between the electronic device 101 and the first external electronic device may be performed. After the verification operation, the NFC module 180 may operate in at least one of a reader mode 2320, a search mode 2310, or a card emulation mode 2330. According to an embodiment, in the state in which the electronic device 101 and the first external electronic device 400 are coupled, the NFC module 180 may switch to an accessory mode 2300 to transmit the power and data to the first external electronic device (e.g., the accessory apparatus 400) according to the event occurred in the electronic device 101. The accessory mode 2300 may be an operation mode in which the power and data may be transmitted to the first external electronic device (e.g., the accessory apparatus 400), or in which the second external electronic device (e.g., the NFC reader) may be searched for (or detected).

According to an embodiment, if the second external electronic device (e.g., the NFC reader) is detected during the accessory mode 2300, the NFC module 180 may switch to the card emulation mode 2330 in order to thereby allow the second external electronic device (e.g., the NFC reader) to read the data of the NFC module 180.

According to an embodiment, when the operation of the second external electronic device (e.g., the NFC reader) is completed, the NFC module 180 may operate in at least one of the accessory mode 2300, the card emulation mode 2330, the search mode 2310, or the reader mode 2320.

According to an embodiment, if the second external electronic device (e.g., the NFC reader) is not detected during the accessory mode 2300 and the transmission of the power and data to the first external electronic device (e.g., the accessory apparatus 400) is completed, the NFC module 180 may operate in at least one of the accessory mode 2300, the card emulation mode 2330, the search mode 2310, or the reader mode 2320.

In various embodiments, if the external electronic device detects while the electronic device transmits the power and data to the accessory apparatus, the transmission of the power and data with respect to the external electronic device can be quickly performed.

The term "module" as used herein includes a unit that includes hardware, software, or firmware and may be used interchangeably with the term, for example, "logic", "logical block, or "circuit. The "module" may be an integrated part, or a minimum unit for performing one or more functions or a part thereof. The "module" may be mechanically or electronically implemented and may include, for example, an ASIC chip, a FPGA, or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. When the instruction executed by a processor (e.g., the processor 120), the processor may perform a function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. A module or a programming module according to various embodiments may include one or more of the above-described elements, does not include some thereof, or further include other additional elements. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What claimed is:

1. An electronic device comprising:
   a housing;
   a display exposed through a first portion of the housing;
   a conductive pattern configured to:
      be positioned inside the housing, or
      form a part of the housing;
   a wireless communication circuit configured to:
      electrically connect with the conductive pattern, and
      support a short-range wireless communication protocol;
   at least one processor configured to electrically connect with the display and the wireless communication circuit; and
   a memory configured to:
      electrically connect with the at least one processor, and
      store instructions that allow the at least one processor to control the wireless communication circuit to:
         operate in a first mode in which first data is provided to a first type of external electronic device for a first time period,
         detect an existence of a second type of external electronic device at one or more selected points of time in the first time period, and
         switch from the first mode to a second mode in which the second type of external electronic device is allowed to read second data for a second time period following the first time period when the existence of the second type of external electronic device is detected.

2. The electronic device according to claim 1, wherein the instructions allow the at least one processor to control the wireless communication circuit to detect the existence of the second type of external electronic device by using an impulse signal.

3. The electronic device according to claim 1, wherein the instructions allow the at least one processor to control the wireless communication circuit to:
   switch into a third mode for detecting the existence of the second type of external electronic device, and
   detect the existence of the second type of external electronic device.

4. The electronic device according to claim 1, wherein the first type of external electronic device comprises an accessory apparatus configured to connect to the electronic device.

5. The electronic device according to claim 4, wherein the instructions allow the at least one processor to:
   transfer a verification request signal to the accessory apparatus through the wireless communication circuit when the accessory apparatus is connected, and
   perform a verification with the accessory apparatus when a verification response signal is received from the accessory apparatus.

6. The electronic device according to claim 4, wherein the instructions allow the at least one processor to:
   when an event for the electronic device occurs, control the wireless communication circuit to operate in the first mode in order to thereby transfer, to the accessory apparatus, power and a first radio frequency (RF) signal containing data related to the event.

7. The electronic device according to claim 4, wherein the instructions allow the at least one processor to:
   determine whether the accessory apparatus is in an open state or in a closed state when an event for the electronic device occurs, and
   if the accessory apparatus is in the closed state, control the wireless communication circuit to operate in the first mode in order to thereby transfer a first radio frequency (RF) signal to the accessory apparatus.

8. The electronic device according to claim 4, wherein the instructions allow the at least one processor to:
   control the wireless communication circuit to transfer, to the accessory apparatus, an event confirmation signal to confirm an occurrence of the event with respect to the accessory apparatus when the occurred event requires a response of the accessory apparatus.

9. The electronic device according to claim 8, wherein the instructions allow the at least one processor to:
   receive, from the accessory apparatus, an event response signal in response to the event confirmation signal through the wireless communication circuit, and
   perform an operation corresponding to the received event response signal.

10. An electronic device comprising:
   a housing;
   a display exposed through a first portion of the housing;
   a conductive pattern configured to:

be positioned inside the housing, or
form a part of the housing;
a wireless communication circuit configured to:
electrically connect with a conductive pattern, and
support a near field communication (NFC) protocol;
at least one processor configured to electrically connect with the display and the wireless communication circuit; and
a memory configured to electrically connect with the at least one processor,
wherein the wireless communication circuit is further configured to:
operate in a first mode for a first time period,
detect an existence of an external electronic device for the first time period, and
switch from the first mode to a second mode to allow the external electronic device to read data for a second time period following the first time period when the existence of the external electronic device is detected.

11. The electronic device according to claim 10, wherein the wireless communication circuit is further configured to detect the existence of the external electronic device by using an impulse signal.

12. A method for operating an electronic device, the method comprising:
providing an electronic device that comprises a housing, a display that is exposed through a first portion of the housing, a conductive pattern that is positioned inside the housing or forms a part of the housing, and a wireless communication circuit that is electrically connected with the conductive pattern;
operating the electronic device in a first mode in which first data is provided to a first type of external electronic device for a first time period;
detecting, by the electronic device, an existence of a second type of external electronic device at one or more selected points of time in the first time period; and
switching from the first mode to a second mode in which the second type of external electronic device is allowed to read second data for a second time period following the first time period when the existence of the second type of external electronic device is detected.

13. The method according to claim 12, wherein the detecting of the existence of the second type of external electronic device comprises detecting the existence of the second type of external electronic device by using an impulse signal.

14. The method according to claim 12, wherein the detecting of the existence of the second type of external electronic device comprises:
switching to a third mode for detecting the existence of the second type of external electronic device, and
detecting the existence of the second type of external electronic device.

15. The method according to claim 12, wherein the first type of external electronic device comprises an accessory apparatus configured to connect to the electronic device.

16. The method according to claim 15, further comprising:
transferring a verification request signal to the accessory apparatus when the accessory apparatus is connected; and
performing a verification with the accessory apparatus when a verification response signal is received from the accessory apparatus.

17. The method according to claim 12, further comprising, when an event for the electronic device occurs, operating in the first mode in order to thereby transfer, to the accessory apparatus, power and a first radio frequency (RF) signal containing data related to the event.

18. The method according to claim 12, further comprising:
determining whether the accessory apparatus is in an open state or in a closed state when an event for the electronic device occurs; and
if the accessory apparatus is in the closed state, transferring the first radio frequency (RF) signal to the accessory apparatus.

19. The method according to claim 12, further comprising:
transferring, to the accessory apparatus, an event confirmation signal to confirm an occurrence of the event with respect to the accessory apparatus when the occurred event requires a response of the accessory apparatus.

20. The method according to claim 19, further comprising:
receiving, from the accessory apparatus, an event response signal in response to the event confirmation signal; and
performing an operation corresponding to the received event response signal.

* * * * *